(12) United States Patent
Lee et al.

(10) Patent No.: US 11,584,397 B2
(45) Date of Patent: Feb. 21, 2023

(54) ELECTRONIC DEVICE FOR VEHICLE AND METHOD OF OPERATING ELECTRONIC DEVICE FOR VEHICLE

(71) Applicant: LG ELECTRONICS INC., Seoul (KR)

(72) Inventors: Kyoungha Lee, Seoul (KR); Inyoung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/635,897

(22) PCT Filed: Jul. 17, 2019

(86) PCT No.: PCT/KR2019/008853
§ 371 (c)(1),
(2) Date: Jan. 31, 2020

(87) PCT Pub. No.: WO2021/010524
PCT Pub. Date: Jan. 21, 2021

(65) Prior Publication Data
US 2022/0135081 A1    May 5, 2022

(51) Int. Cl.
*B60W 60/00*  (2020.01)
*G06T 7/70*  (2017.01)
*G06V 20/58*  (2022.01)
*G06V 40/10*  (2022.01)
*G06V 40/20*  (2022.01)
*B60K 35/00*  (2006.01)
*B60Q 1/50*  (2006.01)
*B60W 40/08*  (2012.01)

(52) U.S. Cl.
CPC ....... *B60W 60/00253* (2020.02); *B60K 35/00* (2013.01); *B60Q 1/50* (2013.01); *B60W 40/08* (2013.01); *G06T 7/70* (2017.01); *G06V 20/58* (2022.01); *G06V 40/103* (2022.01); *G06V 40/20* (2022.01); *B60K 2370/168* (2019.05); *B60K 2370/797* (2019.05); *B60W 2540/041* (2020.02); *B60W 2540/223* (2020.02); *G06T 2207/30196* (2013.01)

(58) Field of Classification Search
None
See application file for complete search history.

(56) References Cited

U.S. PATENT DOCUMENTS

| | | | |
|---|---|---|---|
| 10,527,428 B1* | 1/2020 | Mehta | G05D 1/0027 |
| 10,579,788 B2* | 3/2020 | Dyer | G06V 40/103 |
| 2017/0193627 A1* | 7/2017 | Urmson | G01C 21/3617 |
| 2018/0129981 A1* | 5/2018 | Fujimoto | G06V 40/10 |
| 2018/0196416 A1* | 7/2018 | Iagnemma | G05D 1/0027 |
| 2019/0265703 A1* | 8/2019 | Hicok | G05D 1/0242 |
| 2020/0070715 A1* | 3/2020 | Krause | B60Q 3/80 |
| 2021/0089983 A1* | 3/2021 | Tamanaha | G06F 16/61 |

* cited by examiner

*Primary Examiner* — Tamara L Weber
(74) *Attorney, Agent, or Firm* — Birch, Stewart, Kolasch & Birch, LLP

(57) ABSTRACT

Disclosed is an electronic device for a vehicle, including a processor acquiring image data acquired by a camera mounted in a vehicle, determining a riding intention of an outside person based on the location, posture, and gesture of the outside person detected from the image data, and generating a control signal to stop the vehicle based on the riding intention.

20 Claims, 30 Drawing Sheets

ELECTRONIC DEVICE FOR VEHICLE AND METHOD OF OPERATING ELECTRONIC DEVICE FOR VEHICLE

CROSS REFERENCE TO RELATED APPLICATIONS

This application is the National Phase of PCT International Application No. PCT/KR2019/008853, filed on Jul. 17, 2019, which is hereby expressly incorporated by reference into the present application.

TECHNICAL FIELD

The present disclosure relates to an electronic device for a vehicle and a method of operating an electronic device for a vehicle.

BACKGROUND ART

A vehicle is an apparatus that carries a passenger in the direction intended by the passenger. A car is the main example of such a vehicle. An autonomous vehicle is a vehicle that is capable of traveling autonomously without driving operation by a driver.

Recently, shared autonomous vehicles have been developed. A conventional shared autonomous vehicle allows only people who have previously reserved the use thereof to ride therein. In some cases, there are people who want to ride in a shared autonomous vehicle on the street. Therefore, there is the need to develop a shared autonomous vehicle that can be used by such people.

DISCLOSURE

Technical Problem

Therefore, the present disclosure has been made in view of the above problems, and it is an object of the present disclosure to provide an electronic device for a vehicle, which determines the intention of an outside person to ride in a vehicle, which is detected from image data, and generates a control signal for stopping the vehicle.

It is another object of the present disclosure to provide a method of operating an electronic device for a vehicle, which determines the intention of an outside person to ride in a vehicle, which is detected from image data, and generates a control signal for stopping the vehicle.

However, the objects to be accomplished by the disclosure are not limited to the above-mentioned objects, and other objects not mentioned herein will be clearly understood by those skilled in the art from the following description.

Technical Solution

In accordance with an aspect of the present disclosure, the above and other objects can be accomplished by the provision of an electronic device for a vehicle, including a processor acquiring image data acquired by a camera mounted in a vehicle, determining a riding intention of an outside person based on the location, posture, and gesture of the outside person detected from the image data, and generating a control signal to stop the vehicle based on the riding intention.

In accordance with another aspect of the present disclosure, there is provided a method of operating an electronic device for a vehicle, the method including acquiring, by at least one processor, image data acquired by a camera mounted in a vehicle, determining, by the at least one processor, a riding intention of an outside person based on the location, posture, and gesture of the outside person detected from the image data, and generating, by the at least one processor, a control signal to stop the vehicle based on the riding intention.

Details of other embodiments are included in the detailed description and the accompanying drawings.

Advantageous Effects

According to the present disclosure, there are one or more effects as follows.

First, in addition to a person who have previously reserved the use of a shared autonomous vehicle, a person who finds the shared autonomous vehicle in the street may also use the shared autonomous vehicle.

Second, the convenience of a user may be improved by providing service suitable for various situations.

However, the effects achievable through the disclosure are not limited to the above-mentioned effects, and other effects not mentioned herein will be clearly understood by those skilled in the art from the appended claims.

BEST MODE

Reference will now be made in detail to the preferred embodiments of the present disclosure, examples of which are illustrated in the accompanying drawings. Wherever possible, the same reference numbers will be used throughout the drawings to refer to the same or like parts. As used herein, the suffixes "module" and "unit" are added or interchangeably used to facilitate preparation of this specification and are not intended to suggest unique meanings or functions. In describing embodiments disclosed in this specification, a detailed description of relevant well-known technologies may not be given in order not to obscure the subject matter of the present disclosure. In addition, the accompanying drawings are merely intended to facilitate understanding of the embodiments disclosed in this specification and not to restrict the technical spirit of the present disclosure. In addition, the accompanying drawings should be understood as covering all equivalents or substitutions within the scope of the present disclosure.

Terms including ordinal numbers such as first, second, etc. may be used to explain various elements. However, it will be appreciated that the elements are not limited to such terms. These terms are merely used to distinguish one element from another.

It will be understood that when an element is referred to as being "connected" or "coupled" to another element, it can be directly connected or coupled to another element or intervening elements may be present. In contrast, when an element is referred to as being "directly connected" or "directly coupled" to another element, there are no intervening elements present.

The expression of singularity includes a plural meaning unless the singularity expression is explicitly different in context.

It will be further understood that terms such as "include" or "have", when used in this specification, specify the presence of stated features, integers, steps, operations, elements, components, or combinations thereof, but do not preclude the presence or addition of one or more other features, integers, steps, operations, elements, components, or combinations thereof.

Figure 1:
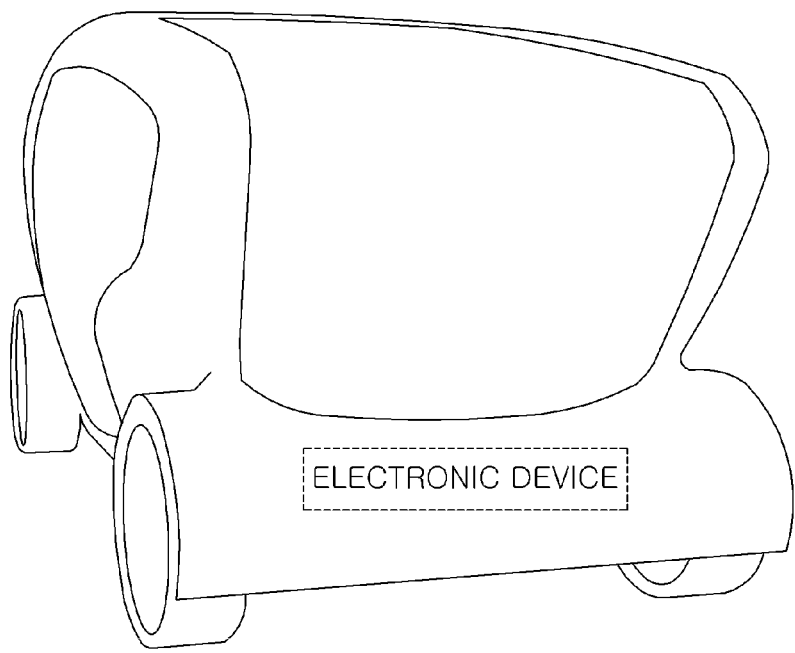
FIG. 1 is a view showing a vehicle according to an embodiment of the present disclosure.
Figure 1:
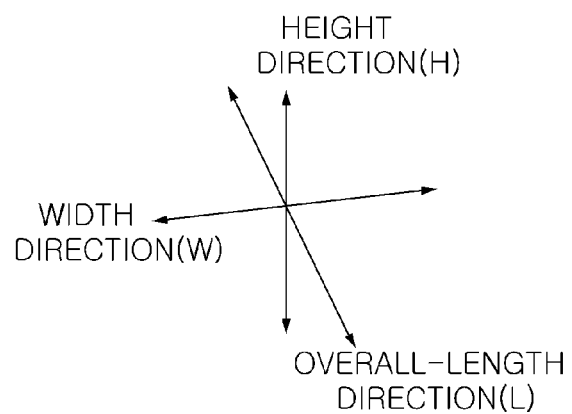

FIG. 1 is a view showing a vehicle according to an embodiment of the present disclosure.

Referring to FIG. 1, a vehicle 10 according to an embodiment of the present disclosure is defined as a transportation means that travels on a road or on rails. The vehicle 10 conceptually encompasses cars, trains, and motorcycles. The vehicle 10 may be any of an internal combustion vehicle equipped with an engine as a power source, a hybrid vehicle equipped with an engine and an electric motor as power sources, an electric vehicle equipped with an electric motor as a power source, and the like. The vehicle 10 may be a shared vehicle. The vehicle 10 may be an autonomous vehicle.

The vehicle 10 may include an electronic device.

The vehicle 10 may interact with at least one robot. The robot may be an autonomous mobile robot (AMR) that autonomously travels. The AMR is autonomously movable and freely moves, and includes a plurality of sensors for avoiding an obstacle or the like while traveling. The AMR may be a flight-type robot (e.g. a drone) that includes a flight device. The AMR may be a wheel-type robot that includes at least one wheel and moves via rotation of the wheel. The AMR may be a leg-type robot that includes at least one leg and moves using the leg.

A robot may function as a device for providing convenience of a user of the vehicle 10. For example, the robot may move a load on the vehicle 10 to a final destination of a user. For example, the robot may guide a road to a final destination to a user who exits from the vehicle 10. For example, the robot may transfer a user who exits from the vehicle 10 to a final destination.

At least one electronic device included in the vehicle may communicate with a robot through a communication device 300.

The at least one electronic device included in the vehicle may provide the robot with data processed by the at least one electronic device included in the vehicle. For example, the at least one electronic device included in the vehicle may provide the robot with at least one of object data, HD map data, vehicle state data, vehicle position data, or driving plan data.

The at least one electronic device included in the vehicle may receive data processed by the robot, from the robot. The at least one electronic device included in the vehicle may receive at least one of sensing data, object data, robot state data, robot position data, or robot moving plan data, which is generated by the robot.

The at least one electronic device included in the vehicle may generate a control signal based further on data received from the robot. For example, the at least one electronic device included in the vehicle may compare information about an object generated by an object detection device with information about an object generated by the robot and may generate a control signal based on the comparison result. The at least one electronic device included in the vehicle may generate a control signal to prevent interference between a moving route of the vehicle 10 and a moving route of the robot.

The at least one electronic device included in the vehicle may include a software module or a hardware module (hereinafter referred to as an "AI module"), which implements artificial intelligence (AI). The at least one electronic device included in the vehicle may input the acquired data to the AI module and may use data output from the AI module.

The AI module may perform machine learning on input data using at least one artificial neural network (ANN). The AI module may output driving plan data by performing machine learning on the input data.

The at least one electronic device included in the vehicle may generate a control signal based on data output from the AI module.

In some embodiments, the at least one electronic device included in the vehicle may receive data processed by IO the AI from an external device through the communication device 300. The at least one electronic device included in the vehicle may generate a control signal based on data processed by the AI.

Figure 2:
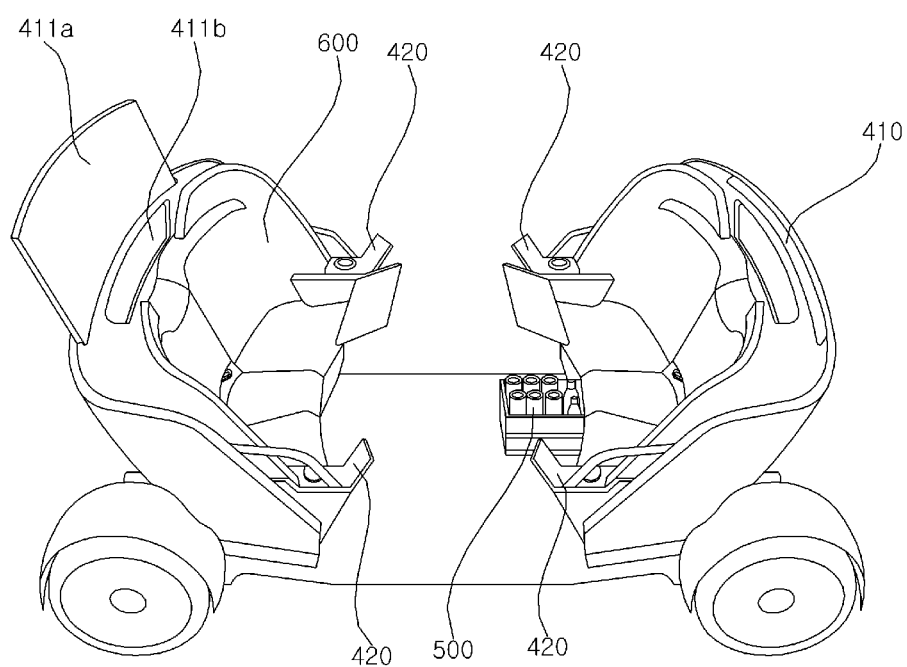
FIG. 2 is a view showing the interior of the vehicle according to the embodiment of the present disclosure.

FIG. 2 is a view showing the interior of the vehicle according to the embodiment of the present disclosure.

Figure 3:
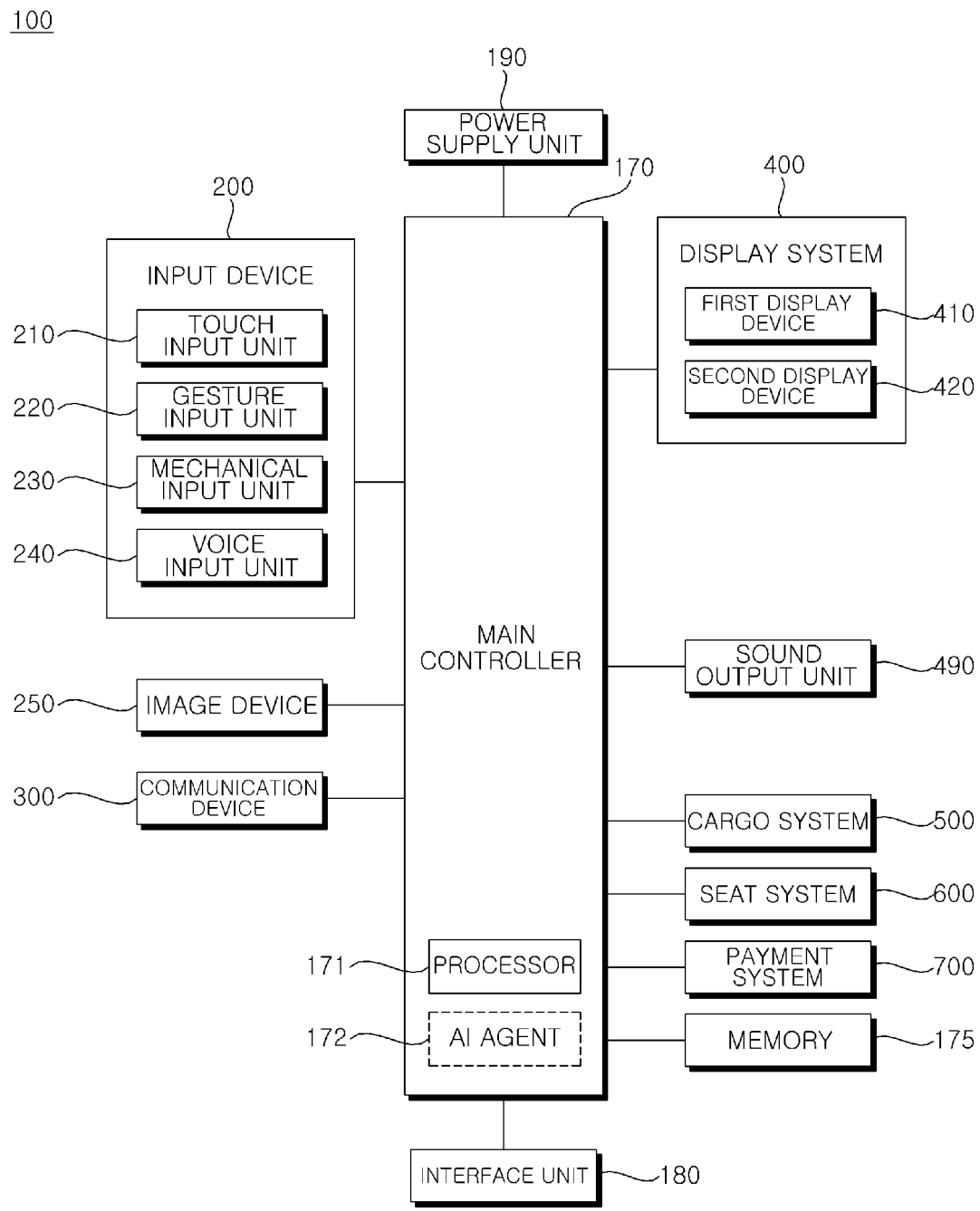
FIG. 3 is a block diagram for explaining a cabin system for a vehicle according to an embodiment of the present disclosure.

FIG. 3 is a block diagram for explaining a cabin system for a vehicle according to an embodiment of the present disclosure.

Figure 4A:
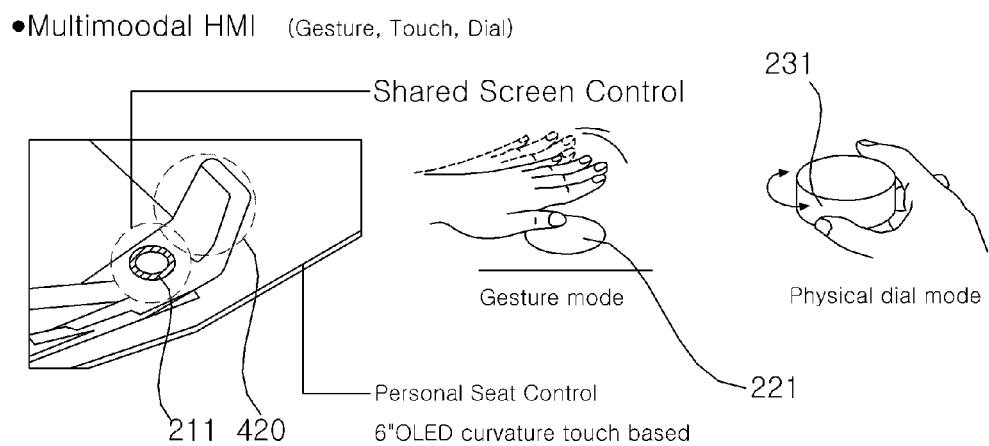
FIGS. 4a to 4c are views for explaining an input device according to an embodiment of the present disclosure.
Figure 4B:
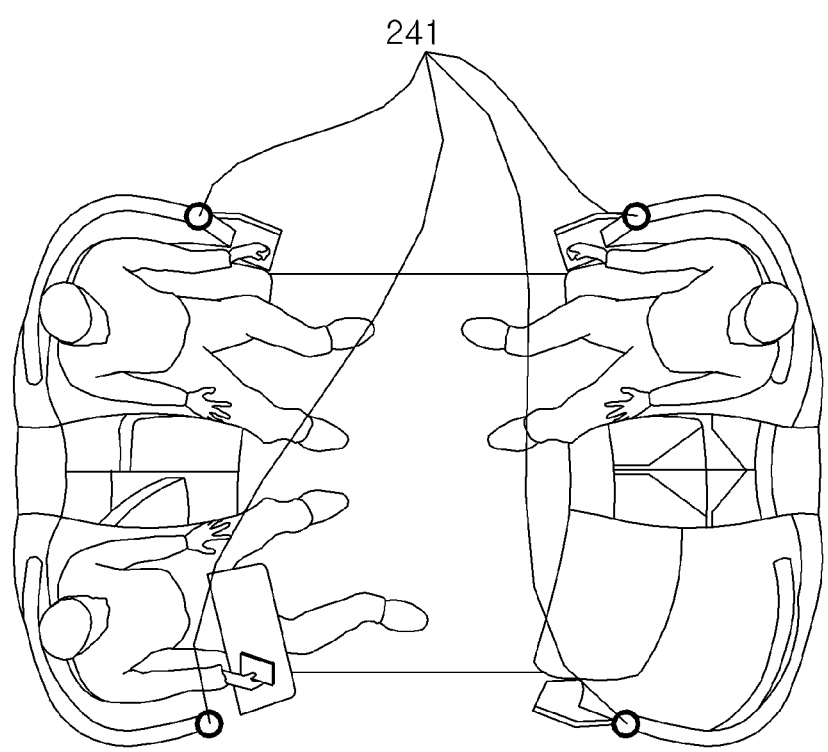
Figure 4C:
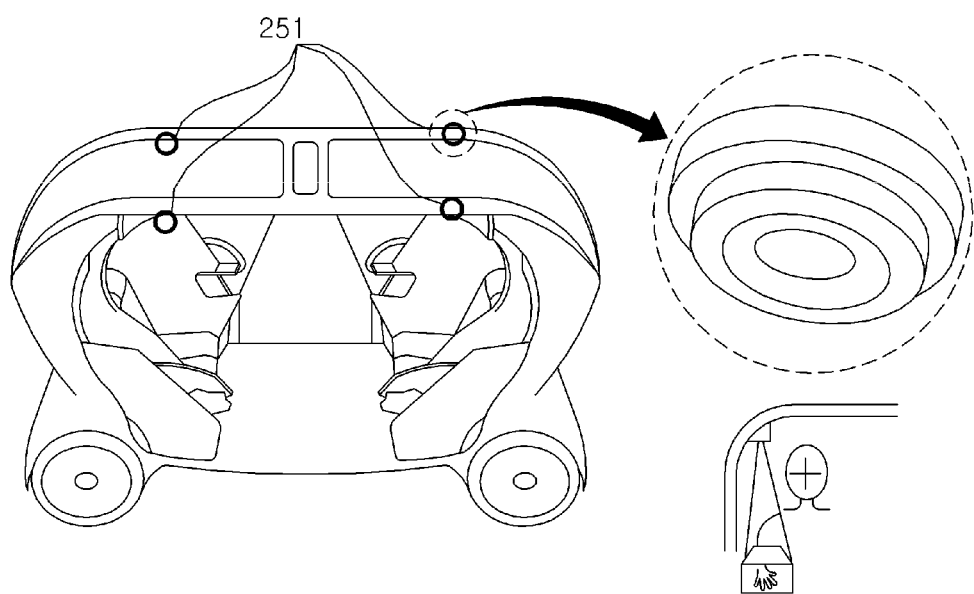

FIGS. 4a to 4c are views for explaining an input device according to an embodiment of the present disclosure.

Figure 5:
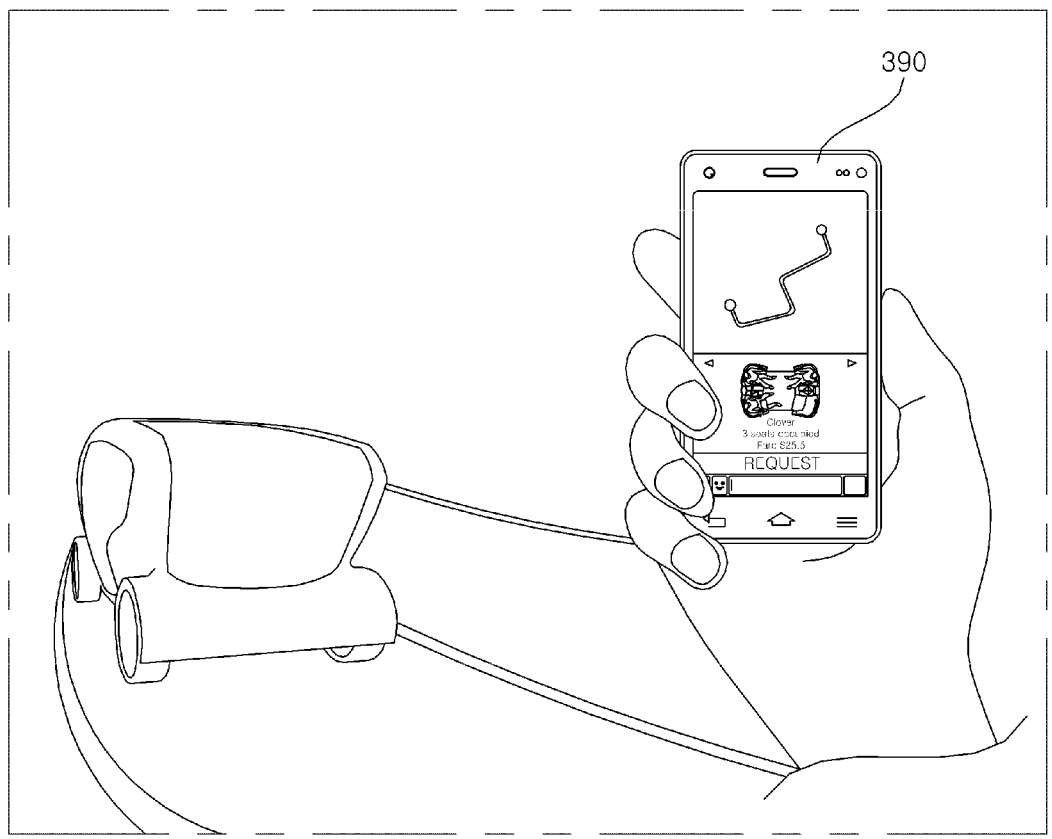
FIG. 5 is a view for explaining a communication operation between a communication device and a mobile terminal according to an embodiment of the present disclosure.

FIG. 5 is a view for explaining a communication operation between a communication device and a mobile terminal according to an embodiment of the present disclosure.

Figure 6:
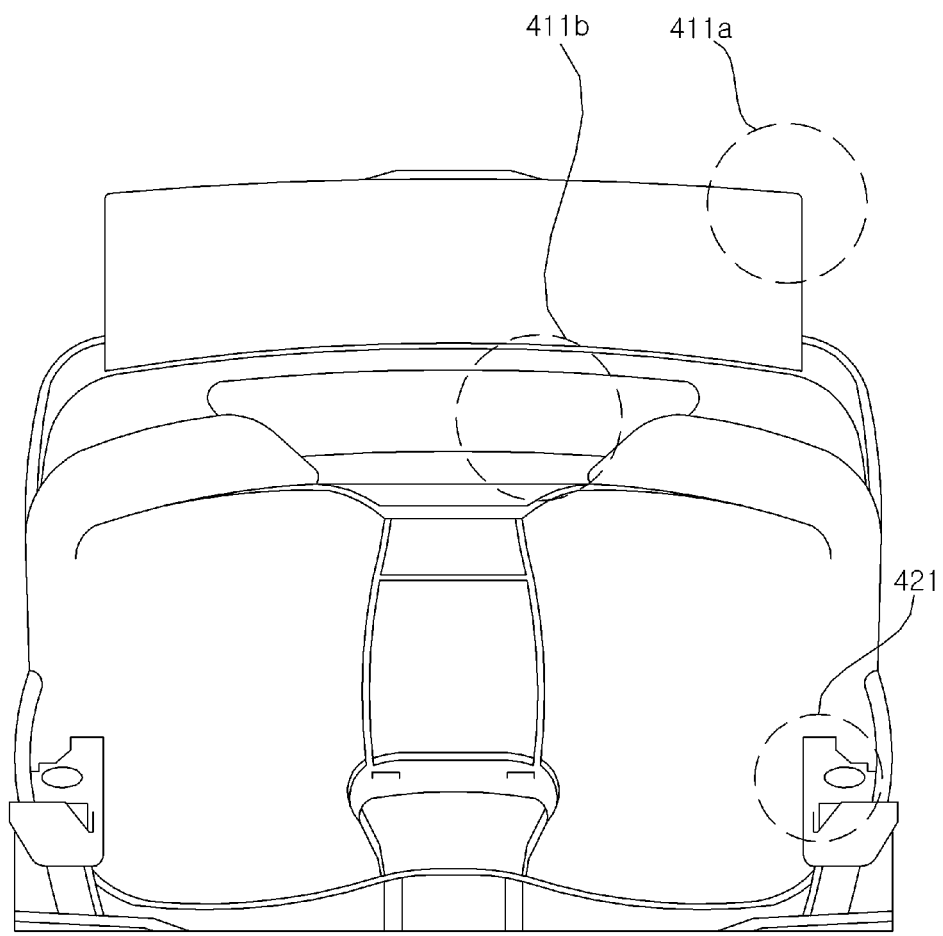
FIG. 6 is a view for explaining a display system according to an embodiment of the present disclosure.

FIG. 6 is a view for explaining a display system according to an embodiment of the present disclosure.

Figure 7:
FIG. 7 is a view for explaining a cargo system according to an embodiment of the present disclosure.

FIG. 7 is a view for explaining a cargo system according to an embodiment of the present disclosure.

Figure 8:
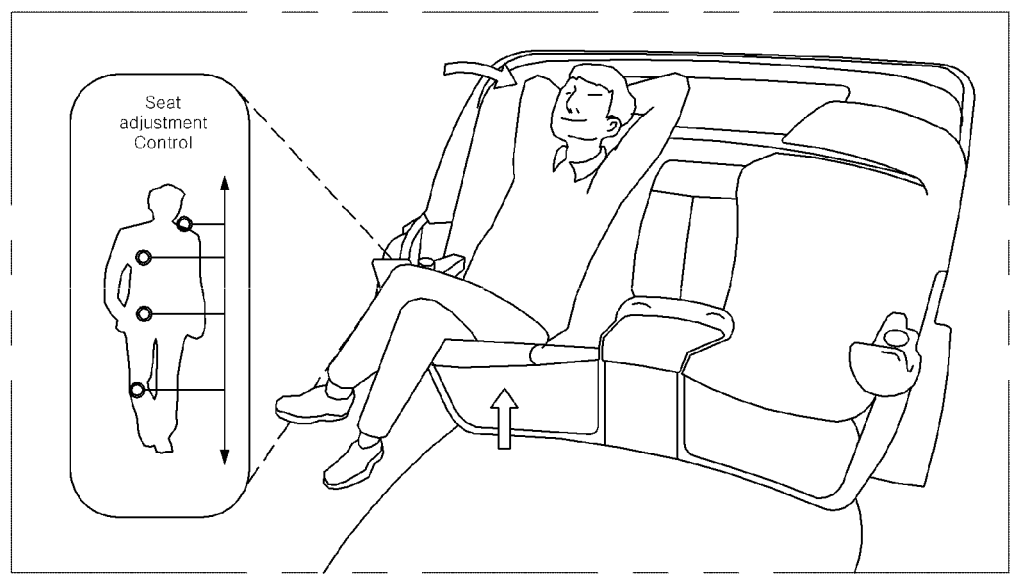
FIG. 8 is a view for explaining a seat system according to an embodiment of the present disclosure.

FIG. 8 is a view for explaining a seat system according to an embodiment of the present disclosure.

Figure 9:
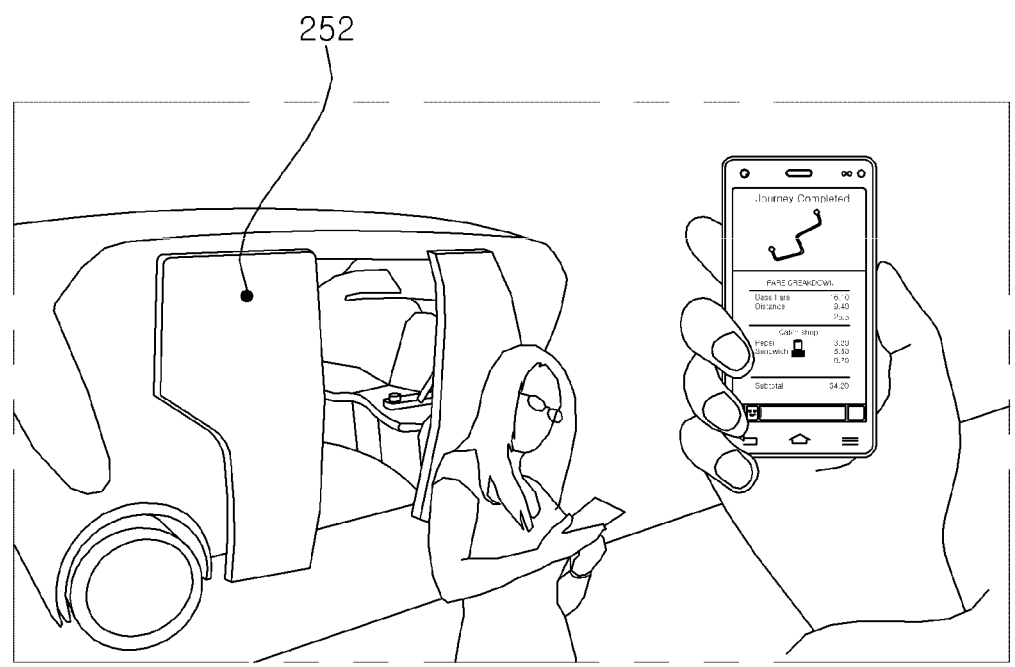
FIG. 9 is a view for explaining a payment system according to an embodiment of the present disclosure.

FIG. 9 is a view for explaining a payment system according to an embodiment of the present disclosure.

Referring to FIGS. 2 to 9, a vehicular cabin system 100 (hereinafter, a cabin system) may be defined as a convenience system for a user who uses the vehicle 10. The cabin system 100 may be described as an uppermost system including a display system 400, a cargo system 500, a seat system 600, and a payment system 700. The cabin system 100 may include a main controller 170, a memory 175, an interface unit 180, a power supply unit 190, an input device 200, an image device 250, a communication device 300, a display system 400, a sound output unit 490, a cargo system 500, a seat system 600, and a payment system 700. In some embodiments, the cabin system 100 may further include components other than the components that are described in this specification, or may not include some of the components that are described.

The main controller 170 may be electrically connected to the input device 200, the communication device 300, the display system 400, the cargo system 500, the seat system 600, and the payment system 700 in order to exchange a signal therewith. The main controller 170 may control the input device 200, the communication device 300, the display system 400, the cargo system 500, the seat system 600, and the payment system 700. The main controller 170 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The main controller 170 may be constituted by at least one sub-controller. In some embodiments, the main controller 170 may include a plurality of sub-controllers. Each of the sub-controllers may individually control devices and systems included in the cabin system 100 in a grouped state. The devices and systems included in the cabin system 100 may be grouped by function, or may be grouped based on an available seat.

The main controller 170 may include at least one processor 171. Although the main controller 170 is exemplarily shown as including a single processor 171 in FIG. 3, the main controller 170 may include a plurality of processors. The processor 171 may be classified as one of the sub-controllers.

The processor 171 may acquire first information about a first user and second information about a second user through the communication device 300. A first mobile terminal of the first user may transmit the first information to the cabin system 100. A second mobile terminal of the second user may transmit the second information to the cabin system 100. The communication device 300 may receive the first information and the second information, and may provide the same to the processor 171.

The processor 171 may specify each of the first user and the second user based on image data received from at least one of an internal camera 251 or an external camera 252. The processor 171 may apply an image processing algorithm to the image data in order to specify the first user and the second user. For example, the processor 171 may compare the first information and the second information with the image data in order to specify the first user and the second user. For example, the first information may include at least one of route information, body information, fellow passenger information, baggage information, location information, content preference information, food preference information, handicap-related information, or use history information of the first user. For example, the second information may include at least one of route information, body information, fellow passenger information, baggage information, location information, content preference information, food preference information, handicap-related information, or use history information of the second user.

The processor 171 may provide a control signal to at least one of a display or a speaker based on an electrical signal generated by the input device 200 such that content is provided to the user.

The processor 171 may determine a first boarding seat of the first user among a plurality of seats according to the first information. The processor 171 may determine the orientation of the first boarding seat according to the first information. The processor 171 may determine a second boarding seat of the second user among the plurality of seats according to the second information. The processor 171 may determine the orientation of the second boarding seat according to the second information.

The processor 171 may determine a service charge based on an electrical signal received from at least one of the communication device 300, the internal camera 251, the external camera 252, the input device 200, the display of the display system 400, the speaker of the sound output unit 490, the cargo system 500, or the seats of the seat system 600. The processor 171 may provide a signal to the payment system 700 such that the determined service charge is charged.

The main controller 170 may include an artificial intelligence agent 172. The artificial intelligence agent 172 may perform machine learning based on data acquired through the input device 200. The artificial intelligence agent 172 may control at least one of the display system 400, the sound output unit 490, the cargo system 500, the seat system 600, or the payment system 700 based on the result of machine learning.

Meanwhile, the main controller 170 may be understood as an electronic device for a vehicle. The electronic device 170 may include an interface unit and a processor 171. The interface unit of the electronic device 170 may exchange a signal with at least one of the communication device 300 for exchanging a signal with an external device, at least one internal camera 251 for capturing an image inside a cabin, at least one external camera 252 for capturing an image outside the vehicle, the input device 200 for converting user input into an electrical signal, at least one display for outputting visual content, at least one speaker for outputting audible content, or a plurality of seats on which a plurality of users is capable of sitting. The processor 171 of the electronic device 170 may acquire the first information about the first user and the second information about the second user through the communication device, may specify each of the first user and the second user based on image data received from at least one of the internal camera or the external camera, may provide a control signal to at least one of the display or the speaker based on an electrical signal generated by the input device such that content is provided to the user, may determine a first boarding seat of the first user among the plurality of seats according to the first information, may determine a second boarding seat of the second user among the plurality of seats according to the second information, may determine the orientation of the first boarding seat according to the first information, and may determine the orientation of the second boarding seat according to the second information.

The memory 175 is electrically connected to the main controller 170. The memory 175 may store basic data about the units, control data necessary to control the operation of the units, and data that are input and output. The memory 175 may store data processed by the main controller 170. In a hardware aspect, the memory 175 may be constituted by at least one of a ROM, a RAM, an EPROM, a flash drive, or a hard drive. The memory 175 may store various data necessary to perform the overall operation of the cabin system 100, such as a program for processing or control of the main controller 170. The memory 175 may be integrated with the main controller 170.

The interface unit 180 may exchange a signal with at least one electronic device provided in the vehicle 10 in a wired or wireless manner. The interface unit 180 may be constituted by at least one of a communication module, a terminal, a pin, a cable, a port, a circuit, an element, or a device.

The power supply unit 190 may supply power to the cabin system 100. The power supply unit 190 may receive power from a power source (e.g. a battery) included in the vehicle 10, and may supply the received power to the respective units of the cabin system 100. The power supply unit 190 may be operated according to a control signal provided from the main controller 170. For example, the power supply unit 190 may be realized as a switched-mode power supply (SMPS).

The cabin system 100 may include at least one printed circuit board (PCB). The main controller 170, the memory 175, the interface unit 180, and the power supply unit 190 may be mounted on the at least one printed circuit board.

The input device 200 may receive user input. The input device 200 may convert the user input into an electrical signal. The electrical signal converted by the input device 200 may be converted into a control signal, which may then be provided to at least one of the display system 400, the sound output unit 490, the cargo system 500, the seat system 600, or the payment system 700. The at least one processor included in the main controller 170 or in the cabin system 100 may generate a control signal based on the electrical signal received from the input device 200.

The input device 200 may include at least one of a touch input unit 210, a gesture input unit 220, a mechanical input unit 230, or a voice input unit 240.

As exemplarily shown in FIG. 4a, the touch input unit 210 may convert user touch input into an electrical signal. The touch input unit 210 may include at least one touch sensor 211 for sensing user touch input. In some embodiments, the touch input unit 210 may be integrated with the at least one display included in the display system 400 in order to realize a touchscreen. The touchscreen may provide both an input interface and an output interface between the cabin system 100 and a user.

As exemplarily shown in FIG. 4a, the gesture input unit 220 may convert user gesture input into an electrical signal. The gesture input unit 220 may include at least one of an infrared sensor 221 or an image sensor for sensing user gesture input. In some embodiments, the gesture input unit 220 may sense three-dimensional user gesture input. To this end, the gesture input unit 220 may include a light output unit for outputting a plurality of infrared beams or a plurality of image sensors. The gesture input unit 220 may sense the three-dimensional user gesture input through a time of flight (TOF) scheme, a structured light scheme, or a disparity scheme.

As exemplarily shown in FIG. 4a, the mechanical input unit 230 may convert physical user input (e.g. push or rotation) through a mechanical device 231 into an electrical signal. The mechanical input unit 230 may include at least one of a button, a dome switch, a jog wheel, or a jog switch.

Meanwhile, the gesture input unit 220 and the mechanical input unit 230 may be integrated into a single unit. For example, the input device 200 may include a jog dial device including a gesture sensor, the jog dial device being configured to protrude from and retreat into a portion of a peripheral structure (e.g. at least one of a seat, an armrest, or a door). In the case in which the jog dial device is level with the peripheral structure, the jog dial device may function as the gesture input unit 220. In the case in which the jog dial device protrudes farther than the peripheral structure, the jog dial device may function as the mechanical input unit 230.

As exemplarily shown in FIG. 4b, the voice input unit 240 may convert user voice input into an electrical signal. The voice input unit 240 may include at least one microphone 241. The voice input unit 240 may include a beamforming microphone.

The image device 250 may include at least one camera. The image device 250 may include at least one of an internal camera 251 or an external camera 252. The internal camera 251 may capture an image inside the cabin, and the external camera 252 may capture an image outside the vehicle.

As exemplarily shown in FIG. 4c, the internal camera 251 may acquire an image inside the cabin. The image device 250 may include at least one internal camera 251. Preferably, the image device 250 includes cameras 251 corresponding in number to the passenger capacity of the vehicle. The image device 250 may provide an image acquired by the internal camera 251. The at least one processor included in the main controller 170 or in the cabin system 100 may detect user motion based on the image acquired by the internal camera 251, may generate a signal based on the detected motion, and may provide the signal to at least one of the display system 400, the sound output unit 490, the cargo system 500, the seat system 600, or the payment system 700.

The external camera 252 may acquire an image outside the vehicle. The image device 250 may include at least one internal camera 252. Preferably, the image device 250 includes cameras 252 corresponding in number to the number of boarding doors. The image device 250 may provide an image acquired by the external camera 252. The at least one processor included in the main controller 170 or in the cabin system 100 may acquire user information based on the image acquired by the external camera 252. The at least one processor included in the main controller 170 or in the cabin system 100 may authenticate the user based on the user information, or may acquire body information (e.g. height information and weight information), fellow passenger information, and baggage information of the user.

Although the input device 200 is exemplarily shown as being directly connected to the main controller 170 in FIG. 3, the input device 200 may be connected to the main controller 170 via the interface unit 180.

The communication device 300 may wirelessly exchange a signal with an external device. The communication device 300 may exchange a signal with the external device over a network, or may directly exchange a signal with the external device. The external device may include at least one of a server, a mobile terminal, or another vehicle. As exemplarily shown in FIG. 5, the communication device 300 may exchange a signal with at least one mobile terminal 390.

The communication device 300 may include at least one of an antenna, a radio frequency (RF) circuit capable of realizing at least one communication protocol, or an RF element in order to perform communication. In some embodiments, the communication device 300 may use a plurality of communication protocols. The communication device 300 may perform switching between the communication protocols depending on the distance from the mobile terminal.

Although the communication device 300 is exemplarily shown as being directly connected to the main controller 170 in FIG. 3, the communication device 300 may be connected to the main controller 170 via the interface unit 180.

As exemplarily shown in FIGS. 2 and 6, the display system 400 may display a graphical object. The display system 400 may include a first display device 410 and a second display device 420.

The first display device 410 may include at least one display 411 for outputting visual content. The display 411 included in the first display device 410 may be realized as at least one of a flat display, a curved display, a rollable display, or a flexible display.

For example, the first display device 410 may include a first display 411 located at the rear of a seat, the first display being configured to protrude into and retreat from the cabin, and a first mechanism for moving the first display 411. The first display 411 may be disposed so as to protrude from and retreat into a slot formed in a seat main frame. In some embodiments, the first display device 410 may further include a flexible area adjustment mechanism. The first display may be formed so as to be flexible, and the flexible area of the first display may be adjusted depending on the location of a user.

For example, the first display device 410 may include a second display located at a ceiling in the cabin, the second display being configured to be rollable, and a second mechanism for rolling or unrolling the second display. The second display may be formed so as to output screens from opposite surfaces thereof.

For example, the first display device 410 may include a third display located at the ceiling in the cabin, the third display being configured to be flexible, and a third mechanism for bending or unbending the third display.

In some embodiments, the display system 400 may further include at least one processor for providing a control signal to at least one of the first display device 410 or the second display device 420. The processor included in the display system 400 may generate a control signal based on a signal received from at least one of the main controller 170, the input device 200, the image device 250, or the communication device 300.

The display area of the display included in the first display device 410 may be divided into a first area 411*a* and a second area 411*b*. The first area 411*a* may be defined as a content display area. For example, the first area 411 may display at least one of entertainment content (e.g. movies, sports, shopping, or music), a video conference, a food menu, or a graphical object corresponding to an augmented reality screen. The first area 411*a* may display a graphical object corresponding to travel status information of the vehicle 10. The travel status information may include at least one of object-outside-vehicle information, navigation information, or vehicle state information. The object-outside-vehicle information may include information about presence or absence of an object, information about the position of the object, information about the distance between the vehicle 100 and the object, and information about speed relative to the object. The navigation information may include at least one of map information, information about a set destination, information about a route based on the setting of the destination, information about various objects on the route, lane information, or information about the current position of the vehicle. The vehicle state information may include vehicle orientation information, vehicle speed information, vehicle tilt information, vehicle weight information, vehicle direction information, vehicle battery information, vehicle fuel information, information about the air pressure of tires of the vehicle, vehicle steering information, vehicle internal temperature information, vehicle internal humidity information, pedal position information, and vehicle engine temperature information. The second area 411*b* may be defined as a user interface area. For example, the second area 411*b* may output an artificial intelligence agent screen. In some embodiments, the second area 411*b* may be located in an area partitioned as a seat frame. In this case, a user may view content displayed in the second area 411*b* between a plurality of seats.

In some embodiments, the first display device 410 may provide hologram content. For example, the first display device 410 may provide hologram content for each user such that only a user who requests content can view the corresponding content.

The second display device 420 may include at least one display 421. The second display device 420 may provide the display 421 at a position at which only an individual passenger confirms content that is displayed. For example, the display 421 may be disposed at an armrest of a seat. The second display device 420 may display a graphical object corresponding to personal information of a user. The second display device 420 may include displays 421 corresponding in number to the passenger capacity of the vehicle. The second display device 420 may be connected to a touch sensor in a layered structure, or may be formed integrally with the touch sensor, so as to constitute a touchscreen. The second display device 420 may display a graphical object for receiving user input for seat adjustment or vehicle internal temperature adjustment.

Although the display system 400 is exemplarily shown as being directly connected to the main controller 170 in FIG. 3, the display system 400 may be connected to the main controller 170 via the interface unit 180.

The sound output unit 490 may convert an electrical signal into an audio signal. The sound output unit 490 may include at least one speaker for outputting audible content.

For example, the sound output unit 490 may include a plurality of speakers provided for available seats.

As exemplarily shown in FIG. 7, the cargo system 500 may provide a product to a user according to a user request. The cargo system 500 may be operated based on an electrical signal generated by the input device 200 or the communication device 300. The cargo system 500 may include a cargo box. The cargo box may be hidden in a portion of the lower end of a seat in the state in which products are loaded therein. In the case in which an electrical signal based on user input is received, the cargo box may be exposed in the cabin. A user may select a desired product from among the products loaded in the cargo box, which is exposed. The cargo system 500 may include a slide moving mechanism and a product pop-up mechanism in order to expose the cargo box according to user input. The cargo system 500 may include a plurality of cargo boxes in order to provide various kinds of products. A weight sensor for determining whether to provide each product may be mounted in the cargo box.

Although the cargo system 500 is exemplarily shown as being directly connected to the main controller 170 in FIG. 3, the cargo system 500 may be connected to the main controller 170 via the interface unit 180.

As exemplarily shown in FIG. 8, the seat system 600 may provide a customized seat to a user. The seat system 600 may be operated based on an electrical signal generated by the input device 200 or the communication device 300. The seat system 600 may adjust at least one element of a seat based on acquired user body data. The seat system 600 may include a user sensor (e.g. a pressure sensor) for determining whether a user sits on the seat.

The seat system 600 may include a plurality of seats on which a plurality of users is capable of sitting. One of the seats may be disposed so as to face at least another of the seats. In the cabin, at least two users may sit so as to face each other.

Although the seat system 600 is exemplarily shown as being directly connected to the main controller 170 in FIG. 3, the seat system 600 may be connected to the main controller 170 via the interface unit 180.

As exemplarily shown in FIG. 9, the payment system 700 may provide a payment service to a user. The payment system 700 may be operated based on an electrical signal generated by the input device 200 or the communication device 300. The payment system 700 may calculate a charge for at least one service used by a user, and may request the user to pay the calculated charge.

Although the payment system 700 is exemplarily shown as being directly connected to the main controller 170 in FIG. 3, the payment system 700 may be connected to the main controller 170 via the interface unit 180.

Meanwhile, in some embodiments, the cabin system 100 may further include a mobile terminal 390 as a component thereof.

Figure 10:
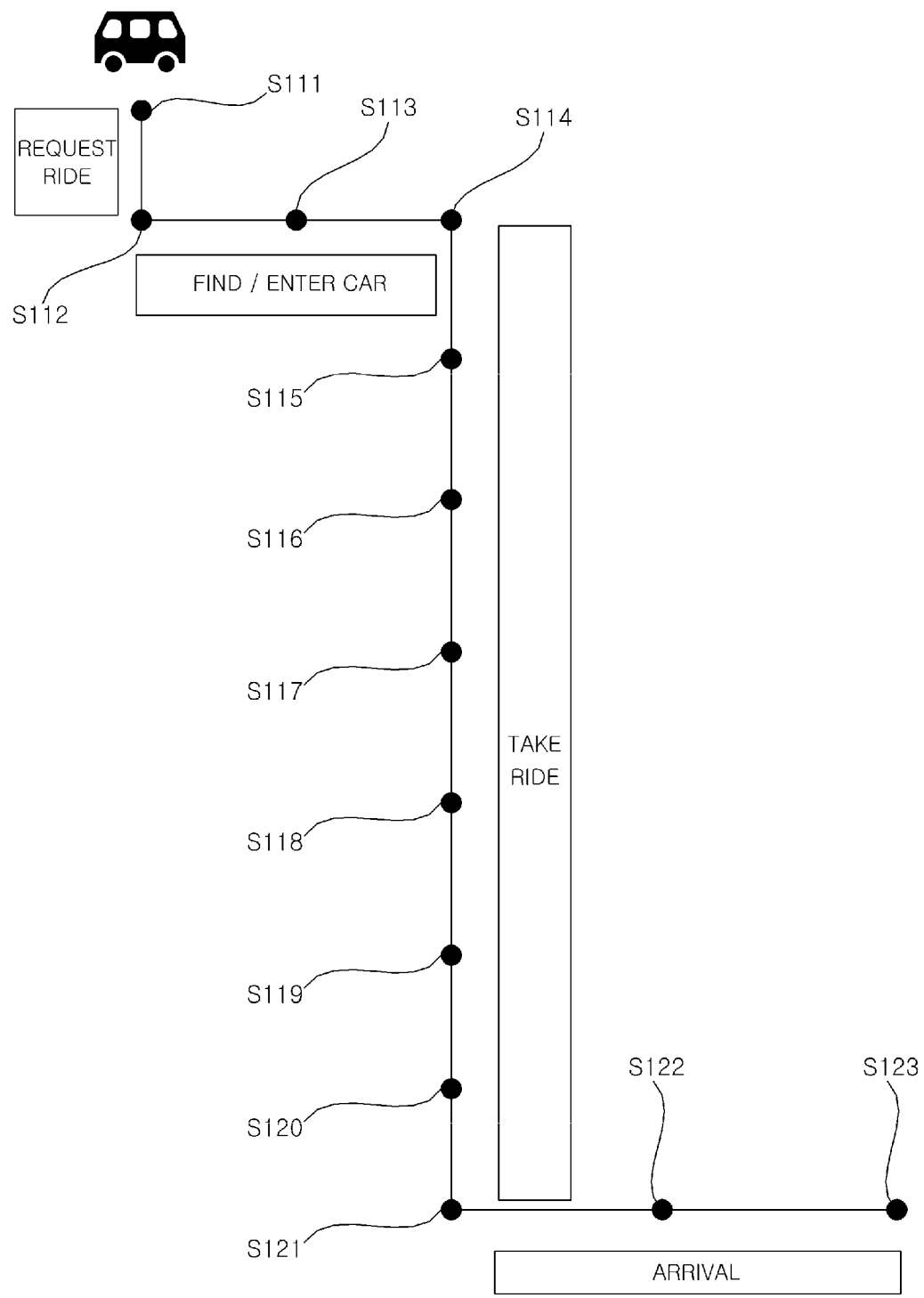
FIG. 10 is a view for explaining a use scenario of a user according to an embodiment of the present disclosure.

FIG. 10 is a view for explaining a use scenario of a user according to an embodiment of the present disclosure.

A first scenario S111 is a user destination forecasting scenario. An application for interoperation with the cabin system 100 may be installed in the mobile terminal 390. The mobile terminal 390 may forecast a user destination based on user's contextual information through the application. The mobile terminal 390 may provide information about a vacant seat in the cabin through the application.

A second scenario S112 is a cabin interior layout preparation scenario. The cabin system 100 may further include a scanner for acquiring data about a user located outside the vehicle 100. The scanner may scan the user in order to acquire user body data and baggage data. The user body data and the baggage data may be used to set a layout. The user body data may be used for user authentication. The scanner may include at least one image sensor. The image sensor may acquire a user image using visible light or infrared light.

The seat system 600 may set a layout in the cabin based on at least one of the user body data or the baggage data. For example, the seat system 600 may be provided with a baggage loading space or a car seat installation space.

A third scenario S113 is a user welcome scenario. The cabin system 100 may further include at least one guide light. The guide light may be disposed on a floor in the cabin. In the case in which riding of a user is sensed, the cabin system 100 may output guide light such that the user sits on a predetermined seat among a plurality of seats. For example, the main controller 170 may realize moving light through sequential turning on of a plurality of light sources over time from an opened door to a predetermined user seat.

A fourth scenario S114 is a seat adjustment service scenario. The seat system 600 may adjust at least one element of a seat that matches with the user based on acquired body information.

A fifth scenario S115 is a personal content provision scenario. The display system 400 may receive user's personal data through the input device 200 or the communication device 300. The display system 400 may provide content corresponding to the user's personal data.

A sixth scenario S116 is a product provision scenario. The cargo system 500 may receive user data through the input device 200 or the communication device 300. The user data may include user preference data and user destination data. The cargo system 500 may provide a product based on the user data.

A seventh scenario S117 is a payment scenario. The payment system 700 may receive data for fare calculation from at least one of the input device 200, the communication device 300, or the cargo system 500. The payment system 700 may calculate a user's vehicle fare based on the received data. The payment system 700 may request the user (e.g. a mobile terminal of the user) to pay the calculated fare.

An eighth scenario S118 is a user display system control scenario. The input device 200 may receive user input having at least one form, and may convert the same into an electrical signal. The display system 400 may control content that is displayed based on the electrical signal.

A ninth scenario S119 is a multichannel artificial intelligence (AI) agent scenario for a plurality of users. The artificial intelligence agent 172 may distinguish between inputs from a plurality of users. The artificial intelligence agent 172 may control at least one of the display system 400, the sound output unit 490, the cargo system 500, the seat system 600, or the payment system 700 based on an electrical signal converted from individual user input.

A tenth scenario S120 is a multimedia content provision scenario for a plurality of users. The display system 400 may provide content that all users can watch together. In this case, the sound output unit 490 may provide the same sound to each user through a speaker provided in each seat. The display system 400 may provide content that a plurality of users can watch individually. In this case, the sound output unit 490 may provide individual sound through a speaker provided in each seat.

An eleventh scenario S121 is a user safety security scenario. In the case in which information about an object around the vehicle that threatens the user is acquired, the main controller 170 may perform control such that an alarm about the object around the vehicle is output through at least one of the display system 400 or the sound output unit 490.

A twelfth scenario S122 is a user's belongings loss prevention scenario. The main controller 170 may acquire data about user's belongings through the input device 200. The main controller 170 may acquire user motion data through the input device 200. The main controller 170 may determine whether the user exits the vehicle while leaving the belongings based on the belongings data and the motion data. The main controller 170 may perform control such that an alarm about the belongings is output through at least one of the display system 400 or the sound output unit 490.

A thirteenth scenario S123 is an exiting report scenario. The main controller 170 may receive user's exiting data through the input device 200. After the user exits the vehicle, the main controller 170 may provide report data based on exiting to the mobile terminal of the user through the communication device 300. The report data may include data about total charges incurred as the result of using the vehicle 10.

Figure 11:
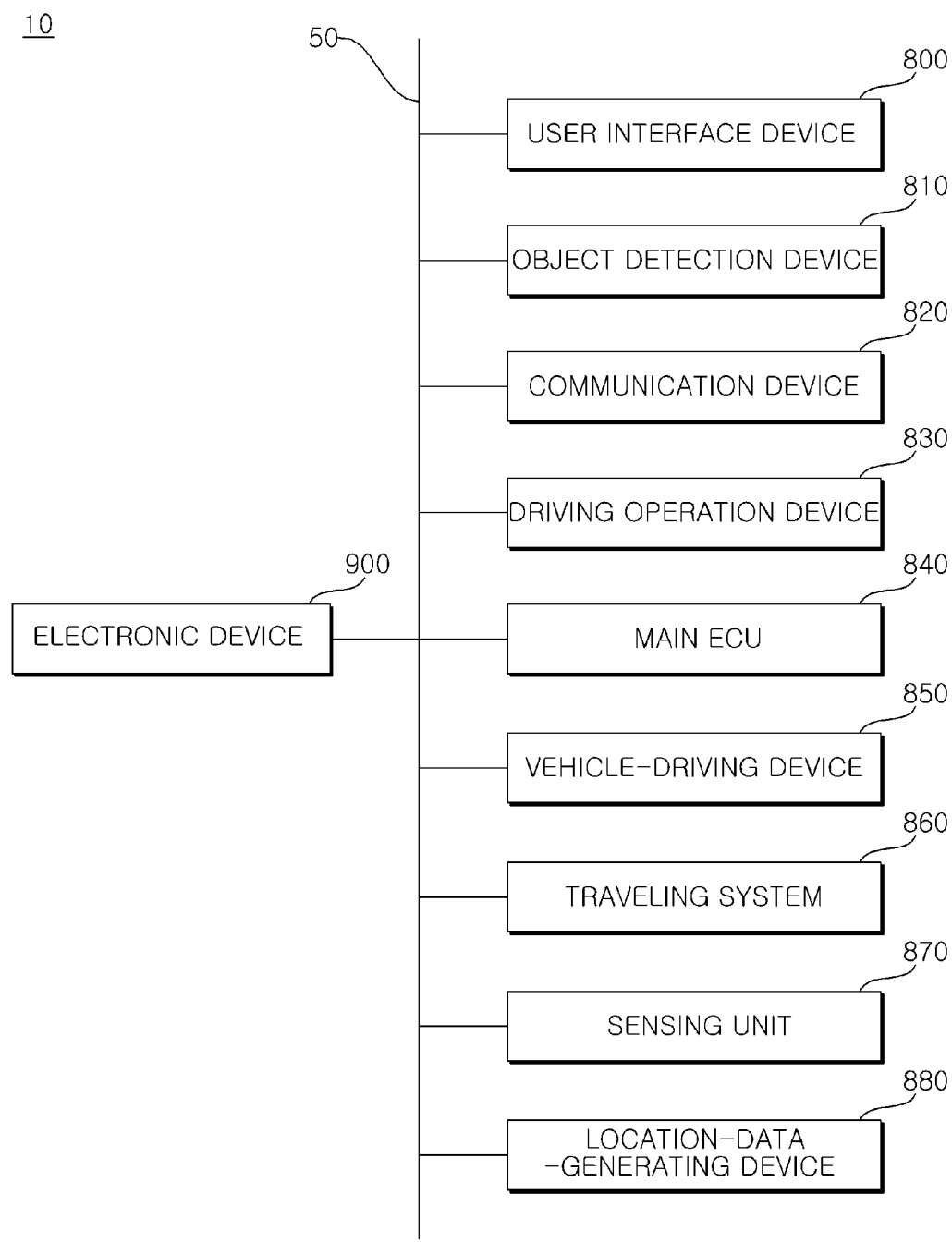
FIG. 11 is a control block diagram of a vehicle according to an embodiment of the present disclosure.

FIG. 11 is a control block diagram of a vehicle according to an embodiment of the present disclosure.

Referring to FIG. 11, the vehicle 10 may include a vehicular electronic device 900, a user interface device 800, an object detection device 810, a communication device 820, a driving operation device 830, a main electronic control unit (ECU) 840, a vehicle-driving device 850, a traveling system 860, a sensing unit 870, and a location-data-generating device 880.

The vehicular electronic device 900 may determine the intention of an outside person to ride in the vehicle, which is detected from image data, and may generate a control signal for stopping the vehicle. The vehicular electronic device 900, as exemplarily shown in FIG. 11, may be a component included in the vehicle 10. In this case, the vehicular electronic device 900 may exchange a signal with other electronic devices in the vehicle 10 using an internal communication system 50.

The user interface device 800 is a device that enables the vehicle 10 to communicate with a user. The user interface device 800 may receive user input, and may provide information generated by the vehicle 10 to the user. The vehicle 10 may implement a User Interface (UI) or User Experience (UX) through the user interface device 800. The user interface device 800 may be implemented as a display device, a head up display (HUD) device, a window display device, a cluster device, or the like, which is installed in the vehicle 10. The user interface device 800 may include an input device, an output device, and a user monitoring device. The user interface device 800 may include an input device such as a touch input device, a mechanical input device, a voice input device, or a gesture input device. The user interface device 800 may include an output device such as a speaker, a display, or a haptic module. The user interface device 800 may include a user monitoring device such as a driver monitoring system (DMS) or an internal monitoring system (IMS).

Meanwhile, the user interface device 800 may include at least one of an input device 200, an image device 250, a display system 400, a sound output unit 490, a cargo system 500, a seat system 600, or a payment system 700.

The object detection device 810 may detect objects outside the vehicle 10. The object detection device 810 may include at least one sensor for detecting objects outside the vehicle 10. The object detection device 810 may include at least one of a camera, a radar, a lidar, an ultrasonic sensor, or an infrared sensor. The object detection device 810 may provide data on an object, which is generated based on a sensing signal generated by a sensor, to at least one electronic device included in the vehicle.

The camera may generate information about an object outside the vehicle 10 using an image. The camera may include at least one lens, at least one image sensor, and at least one processor, which is electrically connected to the image sensor to process a received signal and generates data on an object based on the processed signal.

The camera may be at least one of a mono camera, a stereo camera, or an around view monitoring (AVM) camera. The camera may acquire information about the location of an object, information about the distance to the object, or information about a relative speed with respect to the object using any of various image processing algorithms. For example, the camera may acquire information about the distance to the object and information about a relative speed with respect to the object in an acquired image, based on variation in the size of the object over time. For example, the camera may acquire information about the distance to the object and information about a relative speed with respect to the object through a pin hole model, road surface profiling, or the like. For example, the camera may acquire information about the distance to the object and information about a relative speed with respect to the object based on disparity information in a stereo image acquired by a stereo camera.

In order to acquire an image of the exterior of the vehicle, the camera may be installed to ensure a field of view (FOV) in the vehicle. In order to acquire an image of a front view of the vehicle, the camera may be disposed in the vicinity of a front windshield inside the vehicle. The camera may be disposed around a front bumper or a radiator grill. In order to acquire an image of a rear view of the vehicle, the camera may be disposed in the vicinity of a rear glass inside the vehicle. The camera may be disposed around a rear bumper, a trunk, or a tailgate. In order to acquire an image of a side view of the vehicle, the camera may be disposed in the vicinity of at least one of side windows inside the vehicle. Alternatively, the camera may be disposed around a side view mirror, a fender, or a door.

The radar may generate information about an object outside the vehicle 10 using an electromagnetic wave. The radar may include an electromagnetic wave transmitter, an electromagnetic wave receiver, and at least one processor that is electrically connected to the electromagnetic wave transmitter and the electromagnetic wave receiver to process a received signal and generates data on an object based on the processed signal. The radar may be implemented in a pulse radar scheme or a continuous wave radar scheme according to a radio wave emission principle. The radar may be implemented in a Frequency Modulated Continuous Wave (FMCW) scheme or a Frequency Shift Keying (FSK) scheme according to a signal waveform among the continuous wave radar methods. The radar may detect an object based on a time of flight (TOF) scheme or a phase-shift scheme using electromagnetic waves, and may detect the location of the detected object, the distance to the detected object, and the relative speed with respect to the detected object. The radar may be disposed at an appropriate position on the exterior of the vehicle in order to sense an object ahead of, behind, or beside the vehicle.

The lidar may generate information about an object outside the vehicle 10 using a laser beam. The lidar may include an optical transmitter, an optical receiver, and at least one processor that is electrically connected to the optical transmitter and the optical receiver to process a received signal and generates data on an object based on the processed signal. The lidar may be implemented in a time of flight (TOF) scheme or a phase-shift scheme. The lidar may be implemented in a driven or non-driven manner. If the lidar is implemented in the driven manner, the lidar may be rotated by a motor and may detect an object around the vehicle 10. If the lidar is implemented in a non-driven manner, the lidar may detect an object within a predetermined range from the vehicle through optical steering. The vehicle 900 may include a plurality of non-driven-type lidars. The lidar may detect an object based on a time of flight (TOF) scheme or a phase-shift scheme using laser beams, and may detect the location of the detected object, the distance to the detected object, and the relative speed with respect to the detected object. The lidar may be disposed at an appropriate position on the exterior of the vehicle in order to sense an object ahead of, behind, or beside the vehicle.

The communication device 820 may exchange a signal with a device located outside the vehicle 10. The communication device 820 may exchange a signal with at least one of infrastructure (e.g. a server or a broadcasting station) or other vehicles. The communication device 820 may include at least one of a transmission antenna, a reception antenna, a radio frequency (RF) circuit capable of realizing various communication protocols, or an RF element in order to perform communication.

The communication device 820 may communicate with a device outside the vehicle 10 using a 5G (e.g. a new radio (NR)) scheme. The communication device 820 may implement V2X (V2V, V2D, V2P, or V2N) communication using a 5G scheme.

Meanwhile, the communication device 820 may include the communication device 300 described with reference to FIGS. 2 to 10.

The driving operation device 830 is a device that receives user input for driving the vehicle. In the manual mode, the vehicle 10 may travel based on a signal provided by the driving operation device 830. The driving operation device 830 may include a steering input device (e.g. a steering wheel), an acceleration input device (e.g. an accelerator pedal), and a brake input device (e.g. a brake pedal).

The main ECU 840 may control the overall operation of at least one electronic device provided in the vehicle 10.

The driving control device 850 is a device that electrically controls various vehicle-driving devices provided in the vehicle 10. The driving control device 850 may include a powertrain driving controller, a chassis driving controller, a door/window driving controller, a safety device driving controller, a lamp driving controller, and an air-conditioner driving controller. The powertrain driving controller may include a power source driving controller and a transmission driving controller. The chassis driving controller may include a steering driving controller, a brake driving controller, and a suspension driving controller.

Meanwhile, the safety device driving controller may include a seat belt driving controller for controlling the seat belt.

The vehicle driving control device 850 may be referred to as a control electronic control unit (a control ECU).

The traveling system 860 may generate a signal for controlling the movement of the vehicle 10 or outputting information to the user based on the data on an object received from the object detection device 810. The traveling system 860 may provide the generated signal to at least one of the user interface device 800, the main ECU 840, or the vehicle-driving device 850.

The traveling system 860 may conceptually include an Advanced Driver Assistance System (ADAS). The ADAS 860 may implement at least one of Adaptive Cruise Control (ACC), Autonomous Emergency Braking (AEB), Forward Collision Warning (FCW), Lane Keeping Assist (LKA), Lane Change Assist (LCA), Target Following Assist (TFA), Blind Spot Detection (BSD), High Beam Assist (HBA), Auto Parking System (APS), PD collision warning system, Traffic Sign Recognition (TSR), Traffic Sign Assist (TSA), Night Vision (NV), Driver Status Monitoring (DSM), or Traffic Jam Assist (TJA).

The traveling system 860 may include an autonomous-driving electronic control unit (an autonomous-driving ECU). The autonomous-driving ECU may set an autonomous-driving route based on data received from at least one of the other electronic devices provided in the vehicle 10. The autonomous-driving ECU may set an autonomous-driving route based on data received from at least one of the user interface device 800, the object detection device 810, the communication device 820, the sensing unit 870, or the location-data-generating device 880. The autonomous-driving ECU may generate a control signal so that the vehicle 10 travels along the autonomous-driving route. The control signal generated by the autonomous-driving ECU may be provided to at least one of the main ECU 840 or the vehicle-driving device 850.

The sensing unit 870 may sense the state of the vehicle. The sensing unit 870 may include at least one of an inertial measurement unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, or a brake pedal position sensor. The inertial measurement unit (IMU) sensor may include at least one of an acceleration sensor, a gyro sensor, or a magnetic sensor.

The sensing unit 870 may generate data on the state of the vehicle based on the signal generated by at least one sensor. The sensing unit 870 may acquire sensing signals of vehicle orientation information, vehicle motion information, vehicle yaw information, vehicle roll information, vehicle pitch information, vehicle collision information, vehicle heading information, vehicle angle information, vehicle speed information, vehicle acceleration information, vehicle tilt information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, and so on.

The sensing unit 870 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 870 may generate vehicle state information based on the sensing data. The vehicle state information may be generated based on data detected by various sensors provided in the vehicle.

For example, the vehicle state information may include vehicle orientation information, vehicle speed information, vehicle tilt information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, and so on.

The sensing unit may include a tension sensor. The tension sensor may generate a sensing signal based on the tension state of the seat belt.

The location-data-generating device 880 may generate data on the location of the vehicle 10. The location-data-generating device 880 may include at least one of a global positioning system (GPS) or a differential global positioning system (DGPS). The location-data-generating device 880 may generate data on the location of the vehicle 10 based on the signal generated by at least one of the GPS or the DGPS. In some embodiments, the location-data-generating device 880 may correct the location data based on at least one of the inertial measurement unit (IMU) of the sensing unit 870 or the camera of the object detection device 810.

The location-data-generating device 880 may be referred to as a location positioning device. The location-data-generating device 880 may be referred to as a global navigation satellite system (GNSS).

The vehicle 10 may include an internal communication system 50. The electronic devices included in the vehicle may exchange a signal via the internal communication system 50. The signal may include data. The internal communication system 50 may use at least one communication protocol (e.g. CAN, LIN, FlexRay, MOST, and Ethernet).

Figure 12:
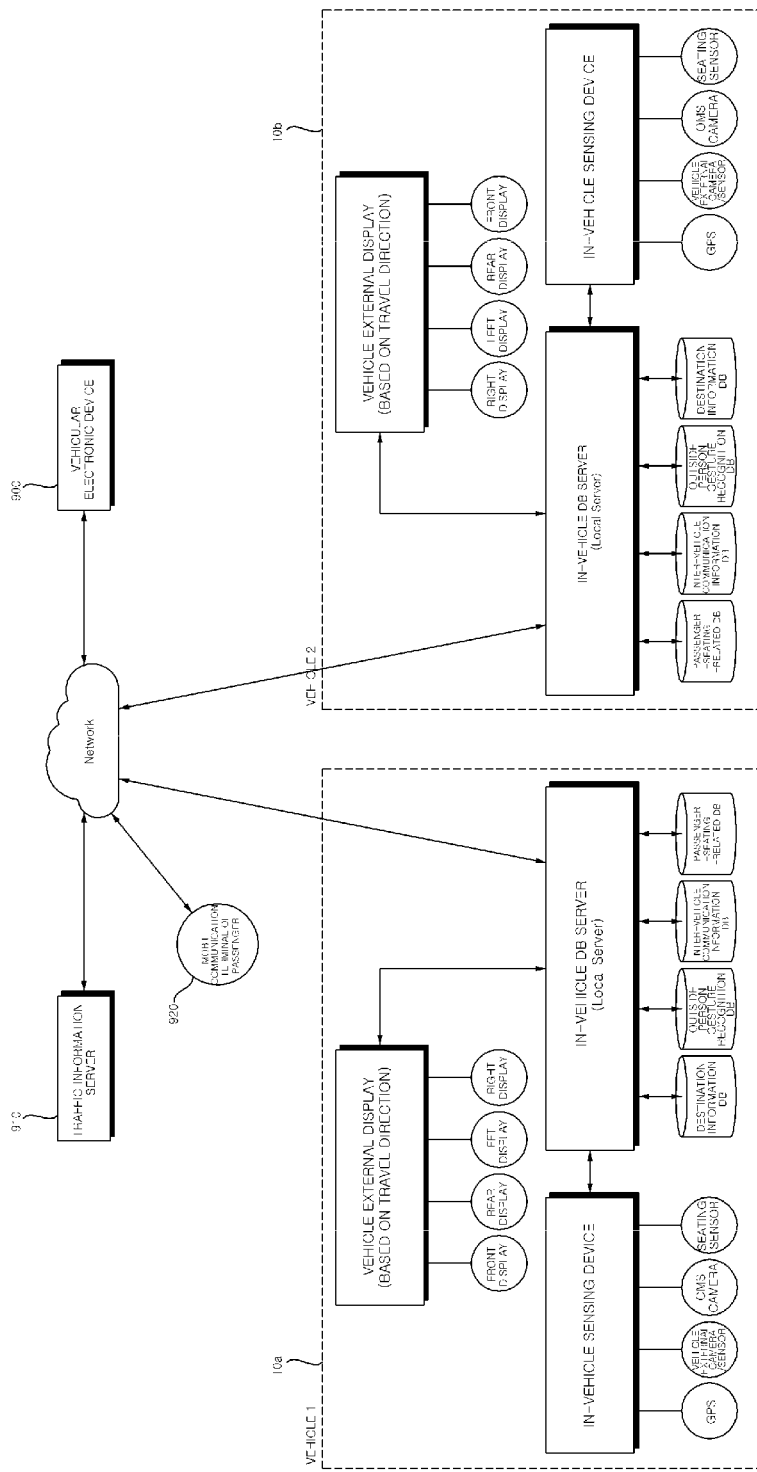
FIG. 12 is a constitutional view of a system according to an embodiment of the present disclosure.

FIG. 12 is a constitutional view of a system according to an embodiment of the present disclosure.

Referring to FIG. 12, the system may include a vehicular electronic device 900, a plurality of vehicles 10*a* and 10*b*, and a traffic information server 910. In some embodiments, the system 1 may further include a user terminal 920.

The vehicular electronic device 900 may be connected to the plurality of vehicles 10*a* and 10*b*, the traffic information server 910, and the user terminal 920 over a network to exchange a signal therewith. The vehicular electronic device 900 may be referred to as a control center server. The vehicular electronic device 900 may be located on the exterior of the vehicle 10, as exemplarily shown in FIG. 12.

The vehicular electronic device 900 may generate a control signal and may provide the same to the plurality of vehicles 10*a* and 10*b*. The vehicular electronic device 900 may generate a signal for controlling the plurality of vehicles 10*a* and 10*b* based on the data received from the traffic information server 910 and the plurality of vehicles 10*a* and 10*b*, and may provide the signal to the plurality of vehicles 10*a* and 10*b*.

The vehicular electronic device 900 may determine the intention of an outside person to ride in the vehicle, which is detected from image data, and may generate a control signal for stopping the vehicle.

The plurality of vehicles 10*a* and 10*b* may be operated based on a signal received from the vehicular electronic device 900. The plurality of vehicles 10*a* and 10*b* may move or output information based on a signal received from the vehicular electronic device 900.

Each of the plurality of vehicles 10*a* and 10*b* may include a vehicle external display, an in-vehicle DB server, and an in-vehicle sensing device. The vehicle external display may include a front display, a rear display, a left-side display, and a right-side display. The in-vehicle sensing device may include a GPS, a vehicle external camera and sensor, an occupant monitoring system (OMS) camera (a vehicle internal camera), and a seating sensor. The in-vehicle DB server may include a destination information DB, an outside person gesture recognition DB, an inter-vehicle communication information DB, and a passenger-seating-related DB.

The traffic information server 910 may collect and provide traffic information. The traffic information server 910 may receive data from a device installed around a road and from the plurality of vehicles 10*a* and 10*b*, may process the received data, and may generate traffic information.

The user terminal 920 may provide user information. The user terminal 920 may provide user reservation information, user personal information, and the like.

Figure 13:
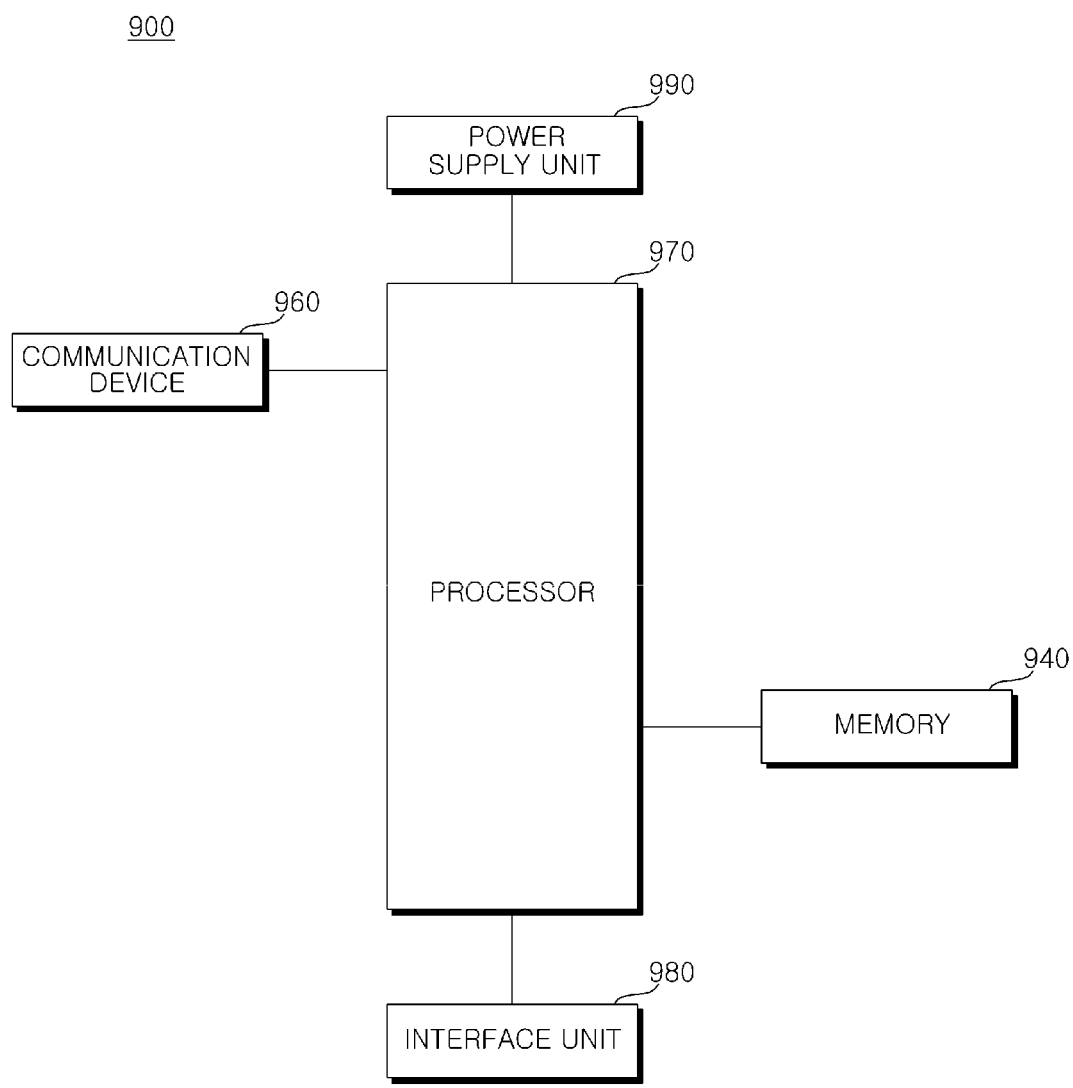
FIG. 13 is a control block diagram of an electronic device for a vehicle according to an embodiment of the present disclosure.

FIG. 13 is a control block diagram of an electronic device for a vehicle according to an embodiment of the present disclosure.

Referring to FIG. 13, the vehicular electronic device 900 may include a memory 940, a processor 970, and a power supply unit 990. In some embodiments, in the case in which the vehicular electronic device 900 is located on the exterior of the vehicle 10, the vehicular electronic device 900 may include a communication device 960. In some embodiments, in the case in which the vehicular electronic device 900 is located inside the vehicle 10, the vehicular electronic device 900 may include an interface unit 980.

The communication device 960 may exchange a signal with the traffic information server (910 in FIG. 12), the user terminal (920 in FIG. 12), and the plurality of vehicles 10*a* and 10*b*. The communication device 820 may include at least one of a transmission antenna, a reception antenna, a radio frequency (RF) circuit capable of realizing various communication protocols, or an RF element in order to perform communication.

The communication device 960 may communicate with an external device using a 5G (e.g. a new radio (NR)) scheme. The communication device 820 may implement V2X (V2V, V2D, V2P, or V2N) communication using a 5G scheme.

The memory 940 is electrically connected to the processor 970. The memory 940 may store basic data about the units, control data necessary to control the operation of the units, and data that are input and output. The memory 940 may store data processed by the processor 970. In a hardware aspect, the memory 940 may be constituted by at least one of a ROM, a RAM, an EPROM, a flash drive, or a hard drive. The memory 940 may store various data necessary to perform the overall operation of the electronic device 900, such as a program for processing or control of the processor 970. The memory 940 may be integrated with the processor 970. In some embodiments, the memory 940 may be configured as a lower-level component of the processor 970.

The interface unit 980 may exchange a signal with at least one electronic device provided in the vehicle 10 in a wired or wireless manner. The interface unit 980 may exchange a signal with at least one of the user interface device (800 in FIG. 11), the object detection device (810 in FIG. 11), the communication device (820 in FIG. 11), the driving operation device (830 in FIG. 11), the main ECU (840 in FIG. 11), the vehicle-driving device (850 in FIG. 11), the traveling system (860 in FIG. 11), the sensing unit (870 in FIG. 11), or the location-data-generating device (880 in FIG. 11) in a wired or wireless manner. The interface unit 980 may be constituted by at least one of a communication module, a terminal, a pin, a cable, a port, a circuit, an element, or a device.

The power supply unit 990 may supply power to the electronic device 900. The power supply unit 990 may receive power from a power source (e.g. a battery) included in the vehicle 10, and may supply the power to the respective units of the electronic device 900. The power supply unit 990 may be operated according to a control signal provided from the main ECU (840 in FIG. 11). The power supply unit 990 may be realized as a switched-mode power supply (SMPS).

The processor 970 may be electrically connected to the memory 940, the interface unit 980, and the power supply unit 990, and may exchange a signal therewith. The processor 970 may be realized using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for performing other functions.

The processor 970 may be driven by the power supplied from the power supply unit 990. The processor 970 may receive data, process data, generate a signal, and provide a signal while receiving the power from the power supply unit 990.

The processor 970 may receive information from the other electronic devices in the vehicle 10 through the interface unit 980. The processor 970 may provide a control signal to the other electronic devices in the vehicle 10 through the interface unit 980.

The processor 970 may receive image data acquired by a camera mounted in the vehicle 10. For example, in the case in which the vehicular electronic device 900 is located on the exterior of the vehicle 10, the processor 970 may receive image data through the communication device 960. For example, in the case in which the vehicular electronic device 900 is located inside the vehicle 10, the processor 970 may receive image data through the interface unit 980.

The processor 970 may determine the intention of an outside person to ride in the vehicle based on the location, posture, and gesture of the outside person detected from the image data. For example, the processor 970 may determine the intention of the outside person to ride in the vehicle based on a combination of the location, posture, and gesture of the outside person detected from the image data.

The processor 970 may determine the intention of the outside person to ride in the vehicle based on the posture of the head, posture of the arm, and posture of the body of the outside person. For example, the processor 970 may determine the intention of the outside person to ride in the vehicle based on the direction in which the head of the outside person is oriented, the angle of the head of the outside person, the shape formed by the arm of the outside person, the inclination of the body of the outside person, and the like.

Upon detecting an outside person's gesture of waving while holding a personal terminal, the processor 970 may determine the waving to be a gesture indicating a riding request intention. For example, upon detecting an outside person's gesture of waving in the state in which the outside person is located near the boundary between the road and the sidewalk or at the boundary therebetween, the processor 970 may determine the waving to be a gesture indicating a riding request intention. Meanwhile, the waving gesture may be described as a gesture of waving an arm in opposite directions.

The processor 970 may generate a control signal for stopping the vehicle 10 based on the determined riding intention of the outside person. Upon determining that the outside person has the intention to ride in the vehicle 10, the processor 970 may determine whether there is space in which the vehicle 10 may stop near the outside person based on the data generated by the object detection device 810. Upon determining that there is space in which the vehicle 10 may stop, the processor 970 may generate a control signal so that the vehicle 10 stops in the corresponding space. The processor 970 may provide a control signal to the vehicle 10.

The processor 970 may select an information output display from among a plurality of external displays mounted in the vehicle 10 according to the travel direction of the vehicle 10. For example, the vehicle 10 may include a plurality of displays for outputting screens to the outside, which are located on the front side, rear side, left side, and right side thereof. The processor 970 may select a display, located so as to be oriented in the direction in which the vehicle may stop, as the information output display.

The processor 970 may provide a signal so that information about the status of the vehicle 10 is displayed on the information output display. The information output display may display information about the status of the vehicle 10 based on the signal received from the vehicular electronic device 900.

The processor 970 may provide a signal so that at least one of destination information, route information, available seat information, occupant information, or special-vehicle-related information is displayed on the information output display. The information output display may display at least one of destination information, route information, available seat information, occupant information, or special-vehicle-related information.

The processor 970 may determine whether there is available space for stopping in the road on which the vehicle 10 is traveling. Upon determining that there is no available space for stopping, the processor 970 may provide a signal so that information about non-availability of the vehicle 10 is displayed on the information output display. The information output display may display information about non-availability of the vehicle 10.

The processor 970 may provide a signal so that content for interaction with an outside person is displayed on the information output display. The information output display may display content for interaction with an outside person.

Upon detecting a plurality of outside persons, the processor 970 may give priority to the first outside person who is closest to the vehicle 10. The processor 970 may select the first outside person as the passenger having the highest priority. The processor 970 may generate a signal for outputting light toward the first outside person. For example, the processor 970 may provide a signal for outputting light toward the first outside person to the lamp mounted in the vehicle 10.

The processor 970 may detect a group composed of a plurality of outside persons. Upon determining that the distance between the plurality of outside persons is equal to or less than a reference value, the processor 970 may determine the group to be a group seeking a ride.

The electronic device 900 may include at least one printed circuit board (PCB). The communication device 960, the memory 940, the interface unit 980, the power supply unit 990, and the processor 970 may be electrically connected to the printed circuit board.

Figure 14:
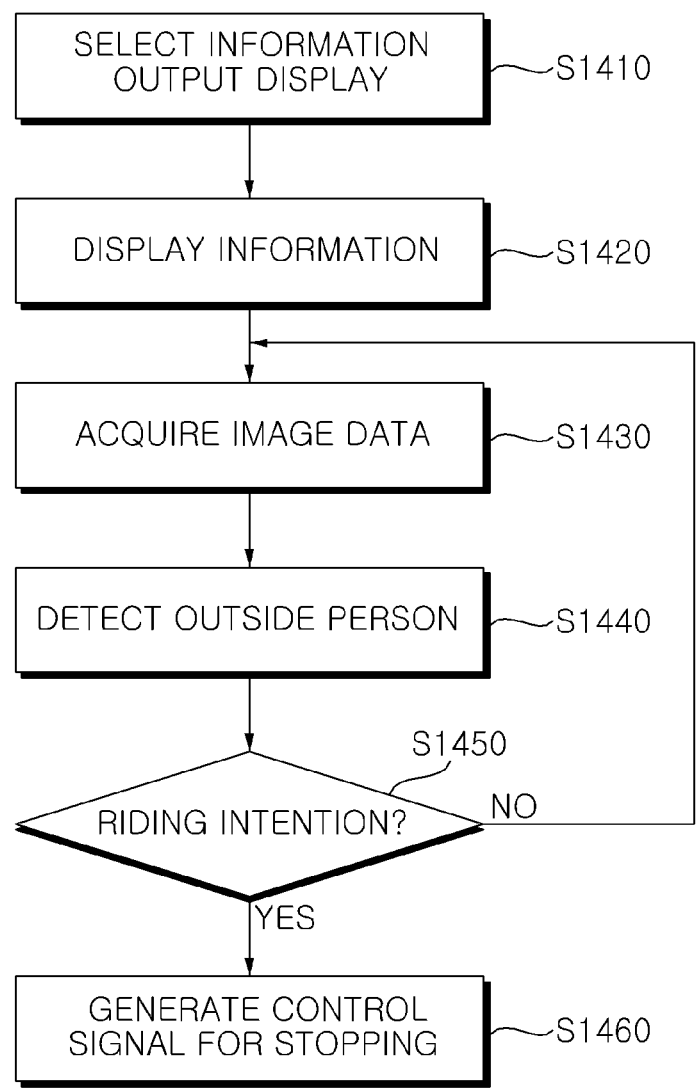
FIG. 14 is a flowchart of the electronic device for a vehicle according to the embodiment of the present disclosure.

FIG. 14 is a flowchart of the electronic device for a vehicle according to the embodiment of the present disclosure.

Referring to FIG. 14, the processor 970 may select an information output display from among a plurality of external displays mounted in the vehicle 10 according to the travel direction of the vehicle 10 (S1410).

The processor 970 may provide a signal so that information about the status of the vehicle 10 is displayed on the information output display (S1420).

The step of providing a signal to display information (S1420) may include providing, by at least one processor 970, a signal so that content for interaction with an outside person is displayed on the information output display.

The step of providing a signal to display information (S1420) may include providing, by the at least one processor 970, a signal so that at least one of destination information, route information, available seat information, occupant information, or special-vehicle-related information is displayed on the information output display.

The step of providing a signal to display information (S1420) may include determining, by the at least one processor 970, whether there is available space for stopping in the road on which the vehicle 10 is traveling, and, upon determining that there is no available space for stopping, providing, by the at least one processor 970, a signal so that information about non-availability of the vehicle 10 is displayed on the information output display.

The processor 970 may acquire image data acquired by the camera mounted in the vehicle 10 (S1430).

The processor 970 may detect an outside person from the image data (S1430).

The step of detecting an outside person (S1430) may include, upon detecting a plurality of outside persons, giving, by the processor 970, priority to the first outside person who is closest to the vehicle 10. The step of detecting an outside person (S1430) may further include generating a signal for outputting light toward the first outside person.

The step of detecting an outside person (S1430) may include detecting, by the at least one processor 970, a group composed of a plurality of outside persons, and, upon determining that the distance between the plurality of outside persons is equal to or less than a reference value, determining, by the at least one processor 970, the group to be a group seeking a ride.

The processor 970 may determine the riding intention of an outside person based on the location, posture, and gesture of the outside person detected from the image data (1440).

The step of determining the riding intention of an outside person (S1440) may include determining, by the at least one processor 970, the riding intention of the outside person based on the posture of the head, the posture of the arms, and the posture of the body of the outside person.

The step of determining the riding intention of an outside person (S1440) may include, upon detecting an outside person's gesture of waving while holding a personal terminal, determining, by the at least one processor 970, the waving to be a gesture indicating a riding request intention.

The step of determining the waving to be a gesture indicating a riding request intention may include, upon detecting the outside person's gesture of waving in the state in which the outside person is located near the boundary between the road and the sidewalk, determining, by the at least one processor 970, the waving to be a gesture indicating a riding request intention.

Upon determining that the outside person has the intention to ride in the vehicle, the processor 970 may generate a control signal for stopping the vehicle 10 based on the intention to ride in the vehicle.

Figure 15:
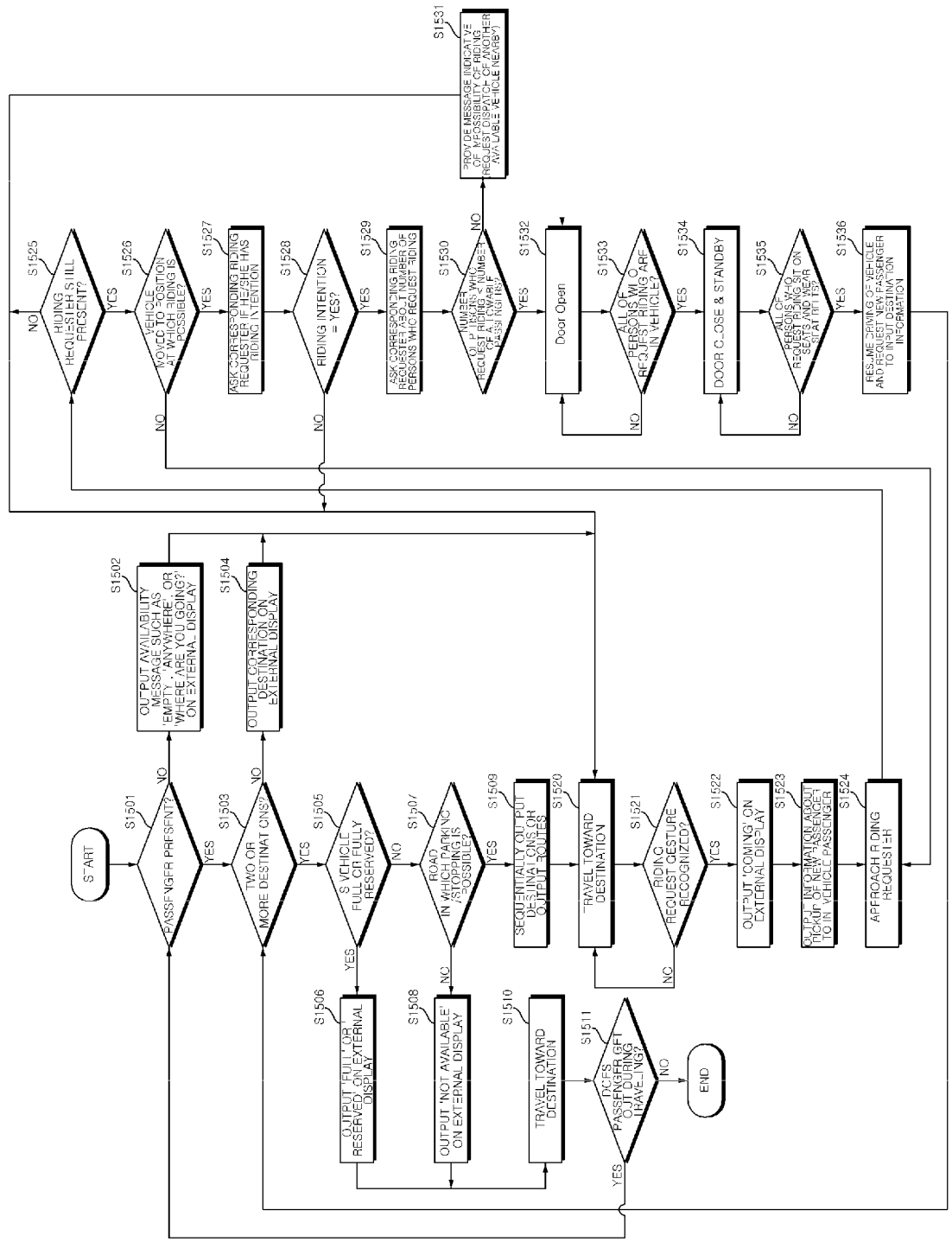
FIG. 15 is a flowchart of the electronic device for a vehicle according to the embodiment of the present disclosure.

FIG. 15 is a flowchart of the electronic device for a vehicle according to the embodiment of the present disclosure.

Referring to FIG. 15, the processor 970 may determine whether a passenger is present (S1501). For example, the processor 970 may determine whether a passenger is present based on the image data generated by the vehicle internal camera.

Upon determining that no passenger is present, the processor 970 may generate a signal for outputting information indicative of availability of the vehicle on the information output display (S1502).

Upon determining that a passenger is present, the processor 970 may determine whether the total number of destinations is two or more (1503). Upon determining that the total number of destinations is not two or more, the processor 970 may generate a signal for outputting information indicative of the corresponding destination on the information output display (S1504).

Upon determining that the total number of destinations is two or more, the processor 970 may determine whether the vehicle is full or fully reserved (S1505). Upon determining that the vehicle 10 is full or fully reserved, the processor 970 may generate a signal for outputting a message indicating that the vehicle is full or fully reserved on the information output display (S1506).

Upon determining that the vehicle is not full or fully reserved, the processor 970 may determine whether the vehicle is located on a road in which parking or stopping is possible (S1507). Upon determining that the vehicle 10 is not located on a road in which parking or stopping is possible, the processor 970 may generate a signal for outputting a message indicative of non-availability of the vehicle 10 on the information output display (S1508).

Upon determining that the vehicle 10 is located on a road in which parking or stopping is possible, the processor 970 may generate a signal so that the vehicle 10 travels toward the destination (S1510). The processor 970 may determine whether a passenger gets out while the vehicle 10 travels toward the destination (S1511). Upon determining that the passenger gets out, the processor 970 may return to step S1501 and may perform the corresponding operation.

In step S1507, upon determining that the vehicle is located on a road in which parking or stopping is possible, the processor 970 may generate a signal for sequentially outputting the destinations or outputting routes on the information output display (S1509).

The processor 970 may generate a signal so that the vehicle 10 travels toward the destination (S1520).

The processor 970 may determine a riding intention of an outside person based on the location, posture, and gesture of the outside person detected from the image data (S1521).

Upon determining that the outside person has the intention to ride in the vehicle, the processor 970 may generate a signal so that a message for interaction with the outside person is displayed on the information output display (S1522).

The processor 970 may generate a signal for informing the occupant of a new passenger and the situation in which the new passenger is being picked up (S1523).

The processor 970 may generate a signal so that the vehicle 10 approaches an outside person (S1524).

The processor 970 may determine whether an outside person is still present (S1525).

Upon determining that an outside person is still present, the processor 970 may generate a signal so that the vehicle 10 moves to a position at which the outside person can get in the vehicle (S1526).

When the vehicle 10 moves to a position at which the outside person can get in the vehicle, the processor 970 may ask the outside person if the outside person has the intention to get in the vehicle (S1527).

Upon determining that the outside person has the intention to get in the vehicle (S1528), the processor 970 may ask the outside person about the number of persons who request riding (S1529).

The processor 970 may compare the number of persons who request riding with the number of allowable passengers (S1530). Upon determining that not all of the persons can ride in the vehicle, the processor 970 may generate a signal for outputting a message indicative of non-availability of the vehicle (S1531). In this case, the processor 970 may generate a signal for requesting dispatch of another vehicle near the outside person.

Upon determining in step S1530 that all of the persons can ride in the vehicle, the processor 970 may open the door (S1532).

Upon determining that all of the persons who request riding are in the vehicle (S1533), the processor 970 may close the door and may enter a standby state (S1534).

Upon determining that the persons who request riding sit on the seats and wear the seat belts (S1535), the processor 970 may generate a signal for resuming driving of the vehicle (S1536). In this case, the processor 970 may request a new passenger to input destination information (S1536).

Thereafter, the processor 970 may perform the operations after step S1503.

Figure 16:
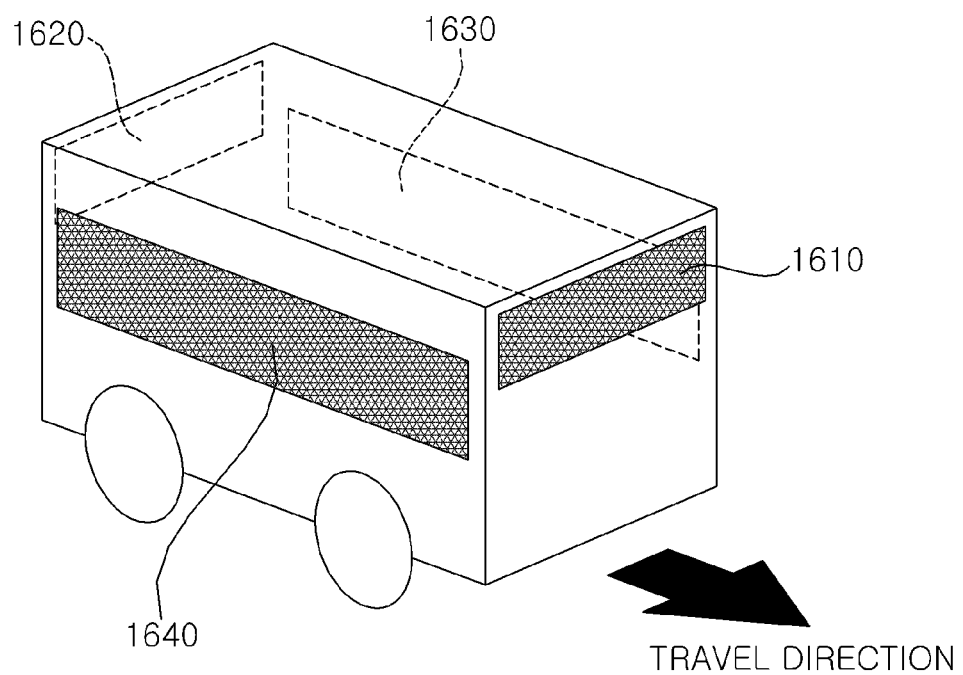
FIG. 16 is a view for explaining an external display mounted in the vehicle according to an embodiment of the present disclosure.
Figure 17:
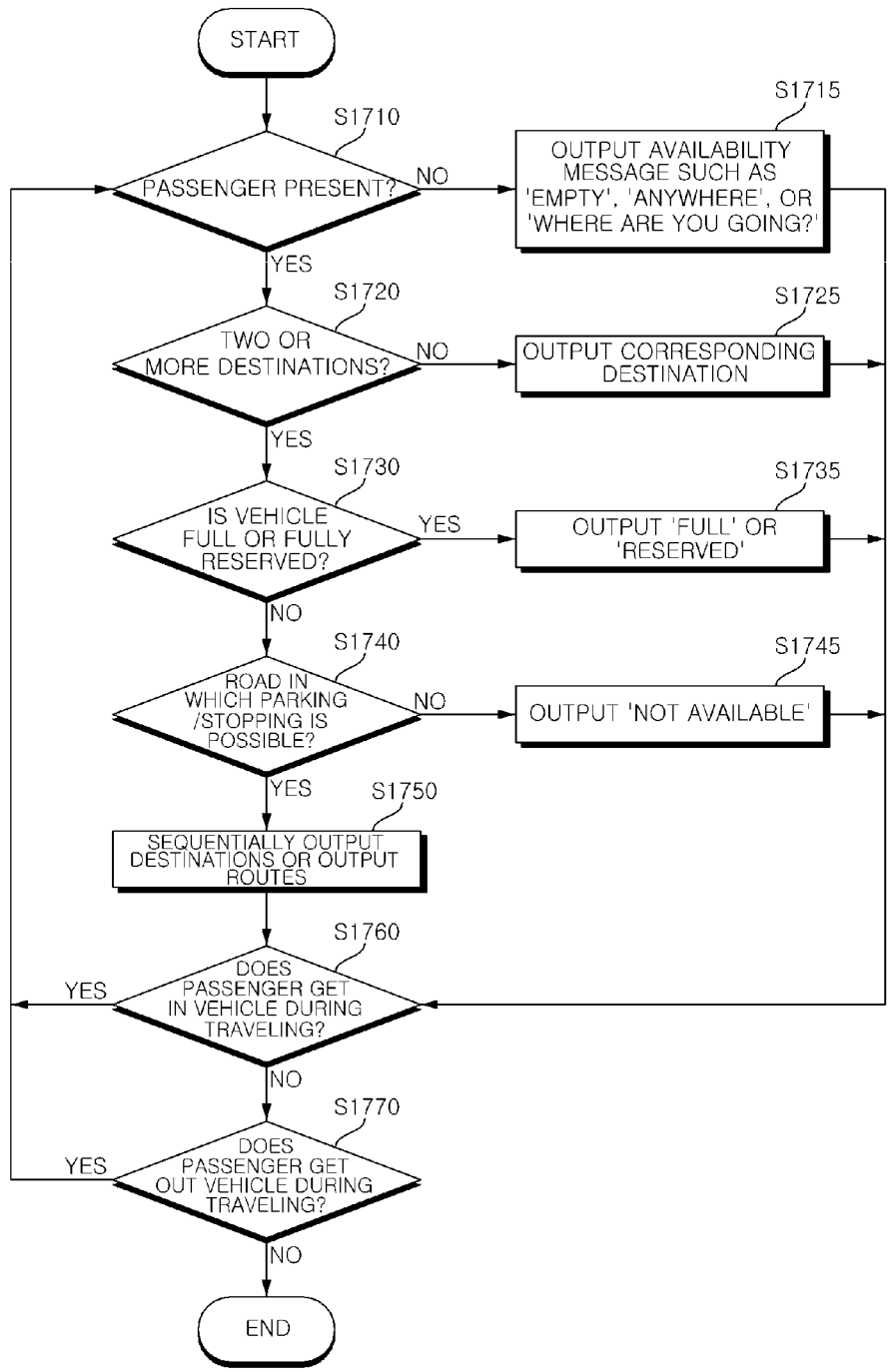
FIG. 17 is a flowchart of the electronic device for a vehicle according to the embodiment of the present disclosure.

FIG. 16 is a view for explaining an external display mounted in the vehicle according to an embodiment of the present disclosure. FIG. 17 is a flowchart of the electronic device for a vehicle according to the embodiment of the present disclosure.

Referring to FIG. 16, the vehicular electronic device 900 may output information on an external display so that an outside person may determine whether the vehicle 10, which is parked or stopped on the shoulder of the road or which is traveling on the road, is heading for the outside person's desired destination and is available.

The vehicle 10 may include a plurality of external displays 1610, 1620, 1630 and 1640. For example, the vehicle 10 may include a front display 1610, which outputs a screen in the forward direction of the vehicle 10, a rear display 1620, which outputs a screen in the backward direction of the vehicle 10, a right display 1630, which outputs a screen in the rightward direction of the vehicle 10, and a left display 1640, which outputs a screen in the leftward direction of the vehicle 10.

The processor 970 may select an information output display from among the plurality of displays 1610, 1620, 1630 and 1640 according to the travel direction of the vehicle 10. For example, upon determining that the vehicle 10 moves forwards, the processor 970 may select the front display 1610 as the information output display. In this case, the processor 970 may use the rear display 1620 as an advertisement output display. For example, upon determining that the vehicle 10 moves backwards, the processor 970 may select the rear display 1620 as the information output display. In this case, the processor 970 may use the front display 1610 as an advertisement output display.

The processor 970 may select an information output display according to a driving standard required by regulations (e.g. left-hand traffic or right-hand traffic). For example, in the case in which left-hand traffic is required by regulations, the processor 970 may select the left display 1640 as the information output display. In this case, the processor 970 may use the right display 1630 as an advertisement output display. For example, in the case in which right-hand traffic is required by regulations, the processor 970 may select the right display 1630 as the information output display. In this case, the processor 970 may use the left display 1640 as an advertisement output display.

Referring to FIG. 17, the processor 970 may output destination information and parking/stopping availability information based on passenger input and the characteristics of the road. The passenger may input a destination through input using a personal terminal, voice input, or touch input using the internal display. The processor 970 may variably display the destinations according to the number of destinations.

The processor 970 may determine whether a passenger is present (S1710). Upon determining that no passenger is present, the processor 970 may generate a signal for outputting information indicating that the vehicle is available on the information output display (S1715).

Upon determining that a passenger is present, the processor 970 may determine whether the total number of destinations is two or more (1720). Upon determining that the total number of destinations is not two or more, the processor 970 may generate a signal for outputting information indicative of the corresponding destination on the information output display (S1725).

Upon determining that the total number of destinations is two or more, the processor 970 may determine whether the vehicle is full or fully reserved (S1730). Upon determining that the vehicle 10 is full or fully reserved, the processor 970 may generate a signal for outputting a message indicating that the vehicle is full or fully reserved on the information output display (S1735).

Upon determining that the vehicle is not full or fully reserved, the processor 970 may determine whether the vehicle is located on a road in which parking or stopping is possible (S1740). Upon determining that the vehicle 10 is not located on a road in which parking or stopping is possible, the processor 970 may generate a signal for outputting a message indicative of non-availability of the vehicle 10 on the information output display (S1745). Upon determining that the vehicle 10 is located on a road in which parking or stopping is possible, the processor 970 may generate a signal for sequentially outputting the destinations or outputting routes on the information output display (S1750).

Thereafter, the processor 970 may determine whether a new passenger rides in the vehicle during traveling of the vehicle (S1760). Upon determining that a new passenger rides in the vehicle, the processor 970 may return to step S1710.

Upon determining that no new passenger rides in the vehicle, the processor 970 may determine whether an occupant gets out during traveling of the vehicle (S1770). Upon determining that an occupant gets out, the processor 970 may return to step S1710.

Figure 18:
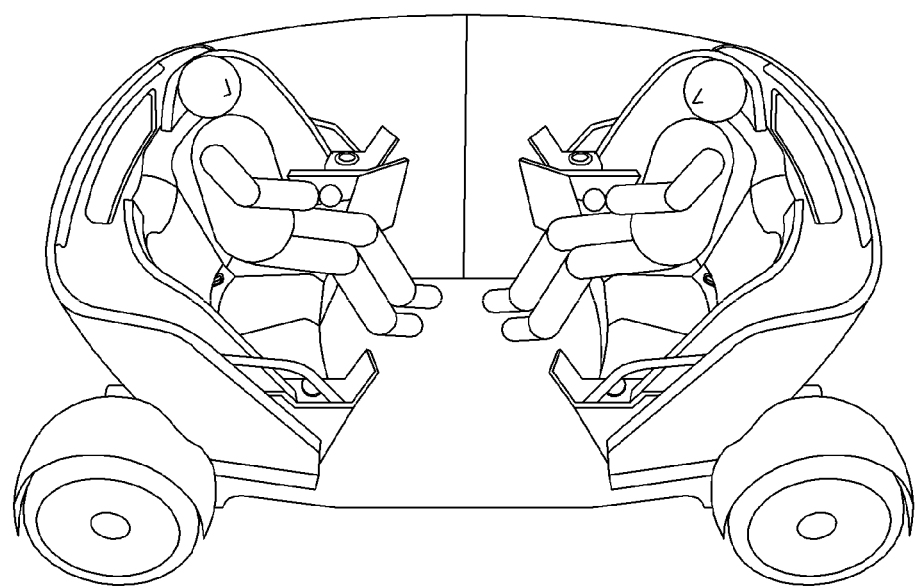
FIG. 18 is a view showing the interior of the vehicle according to the embodiment of the present disclosure.

FIG. 18 is a view showing the interior of the vehicle according to the embodiment of the present disclosure.

Referring to FIG. 18, the processor 970 may acquire internal image data from the internal camera that photographs the interior of the vehicle 10. The processor 970 may detect a passenger from the internal image data. The processor 970 may verify the number of passengers and passengers' locations based on the internal image data. The processor 970 may generate a signal so that information about presence or absence of passengers, information about the number of passengers, and information about passengers' locations are displayed on the information output display.

When the vehicle 10 is a special vehicle, the processor 970 may generate a signal so that information about a service that is provided is output on the information output display. For example, the processor 970 may generate a signal so that information about whether the vehicle 10 is a cafeteria vehicle, a vehicle for the disabled, a vehicle for kids, or a sports vehicle is output.

Figure 19:
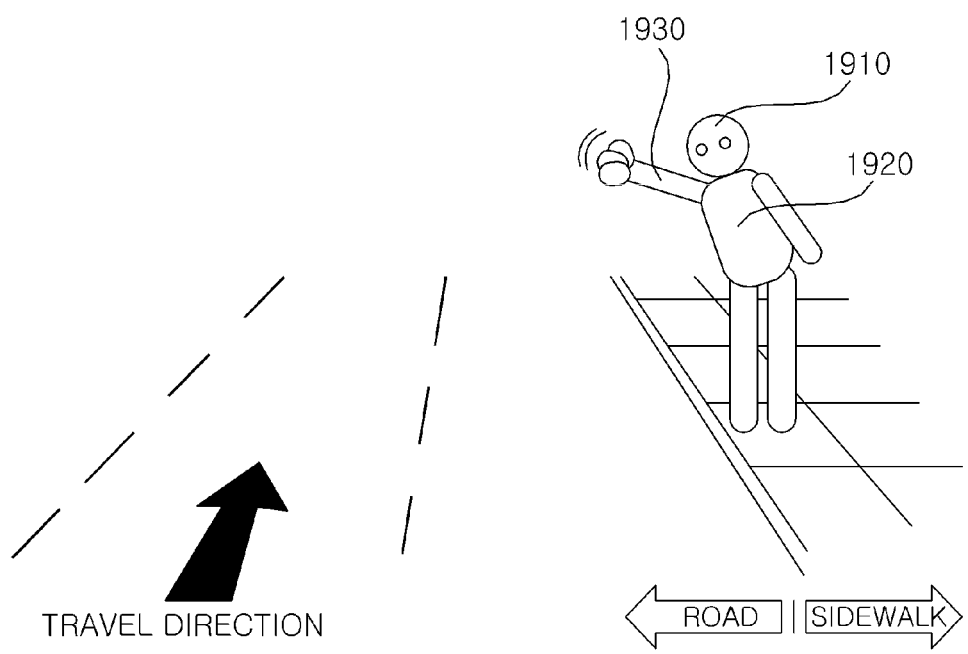
FIG. 19 is a view for explaining an outside person according to an embodiment of the present disclosure.

FIG. 19 is a view for explaining an outside person according to an embodiment of the present disclosure.

Referring to FIG. 19, the vehicular electronic device 900 may recognize and determine a person (an outside person) who requests to ride in a vehicle that is parked or stopped on the shoulder of the road or that is traveling on the road.

The processor 970 may acquire external image data from the camera that photographs the outside of the vehicle 10. The processor 970 may detect an outside person from the external image data. The processor 970 may detect an outside person's face 1910, an outside person's body 1920, an outside person's arm 1930, and an outside person's gesture from the external image data. The processor 970 may determine the riding intention of the outside person based on at least one of the outside person's face 1910, the outside person's body 1920, the outside person's arm 1930, or the outside person's gesture.

Upon determining that the outside person's face 1910 is directed toward the vehicle 10, the processor 970 may determine that the outside person has the intention to ride in the vehicle.

Upon determining that the outside person's eyes are directed toward the vehicle 10 and track the movement of the vehicle 10, the processor 970 may determine that the outside person has the intention to ride in the vehicle.

Upon determining that the outside person's body 1920 is inclined toward the road, the processor 970 may determine that the outside person has the intention to ride in the vehicle.

Upon determining that the outside person's body 1920 faces the vehicle 10, the processor 970 may determine that the outside person has the intention to ride in the vehicle.

Upon determining that the outside person's arm 1930 is stretched toward the road, the processor 970 may determine that the outside person has the intention to ride in the vehicle. In the case in which the outside person's arm 1930 is bent to a certain degree, the processor 970 may also determine that the outside person has the intention to ride in the vehicle.

Upon determining that the outside person's arm 1930 is stretched upwards, the processor 970 may determine that the outside person has the intention to ride in the vehicle. In the case in which the outside person's arm 1930 is bent to a certain degree, the processor 970 may also determine that the outside person has the intention to ride in the vehicle. Upon determining that the outside person's arm 1930 is stretched toward the vehicle 10, the processor 970 may determine that the outside person has the intention to ride in the vehicle. In the case in which the outside person's arm 1930 is bent to a certain degree, the processor 970 may also determine that the outside person has the intention to ride in the vehicle.

Upon determining that the outside person makes a gesture of extending a finger, the processor 970 may determine that the outside person has the intention to ride in the vehicle.

Upon determining that the outside person makes a gesture of raising a hand, the processor 970 may determine that the outside person has the intention to ride in the vehicle.

Upon determining that the outside person makes a gesture of waving an entire arm, the processor 970 may determine that the outside person has the intention to ride in the vehicle.

Upon determining that the outside person is located at the boundary between the road and the sidewalk or within a predetermined distance from the boundary therebetween, the processor 970 may determine that the outside person has the intention to ride in the vehicle.

Figure 20:
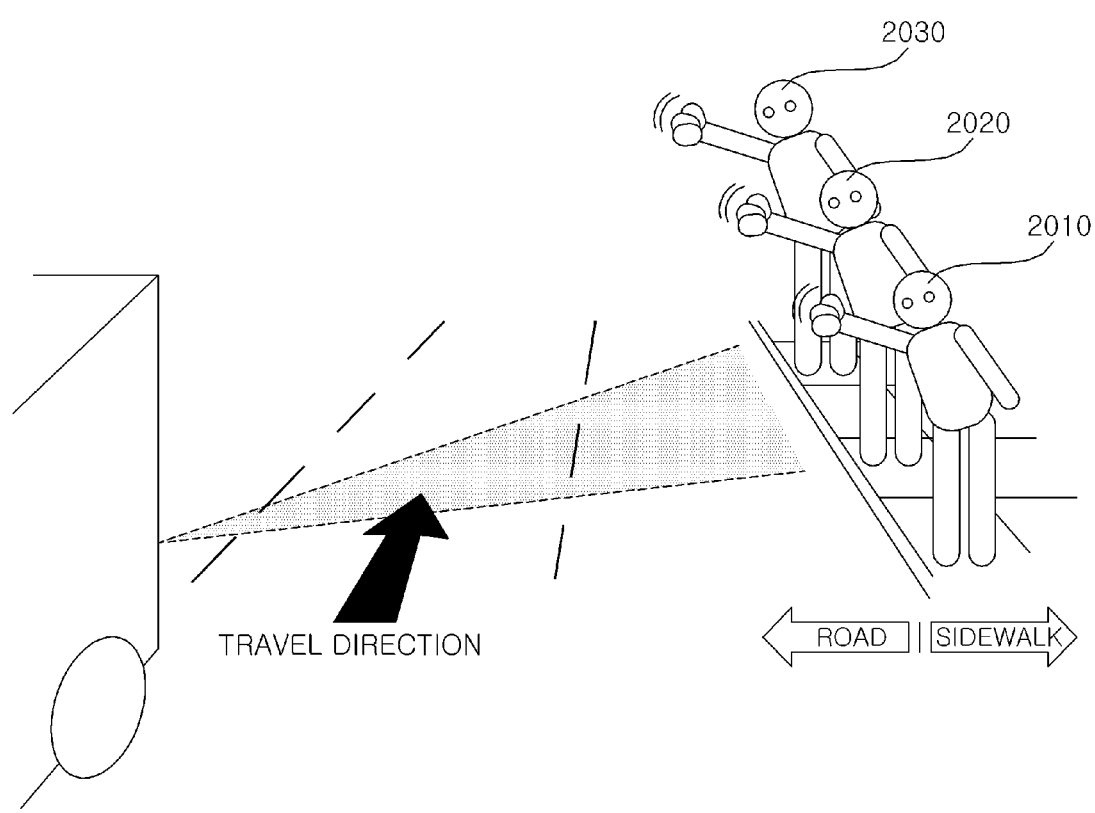
FIG. 20 is a view for explaining the operation of the electronic device for a vehicle when a plurality of outside persons is present according to an embodiment of the present disclosure.

FIG. 20 is a view for explaining the operation of the electronic device for a vehicle when a plurality of outside persons is present according to an embodiment of the present disclosure.

Referring to FIG. 20, the vehicular electronic device 900 may recognize and determine persons (outside persons) who request to ride in a vehicle 10 that is parked or stopped on the shoulder of the road or that is traveling on the road.

The processor 970 may detect a plurality of outside persons 2010, 2020 and 2030 from the external image data. The processor 970 may generate a signal so that light is output to an available location for riding using a lamp of the vehicle (e.g. a headlamp).

The processor 970 may generate a signal so that information about the number of allowable passengers and destination information are displayed on the information output display when the vehicle reaches an available location for riding. The processor 970 may generate a signal for outputting information about the number of allowable passengers and destination information in an audible manner.

The processor 970 may give priority to the first outside person who is closest to the vehicle 10 when the vehicle 10 reaches an available location for riding.

Figure 21A:
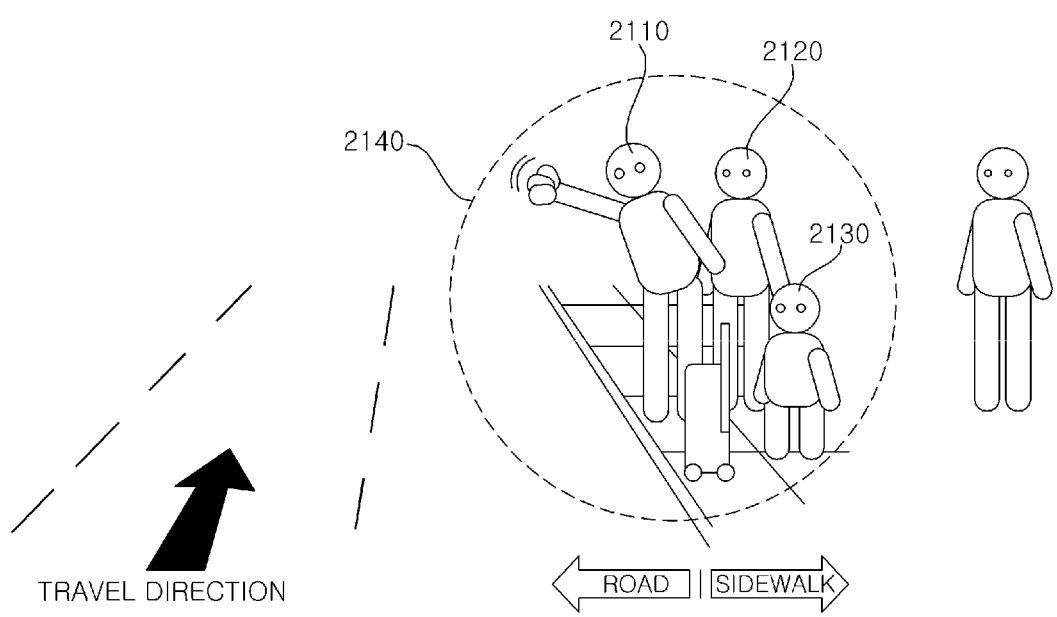
FIGS. 21a and 21b are views for explaining a group seeking a ride according to an embodiment of the present disclosure.
Figure 21B:
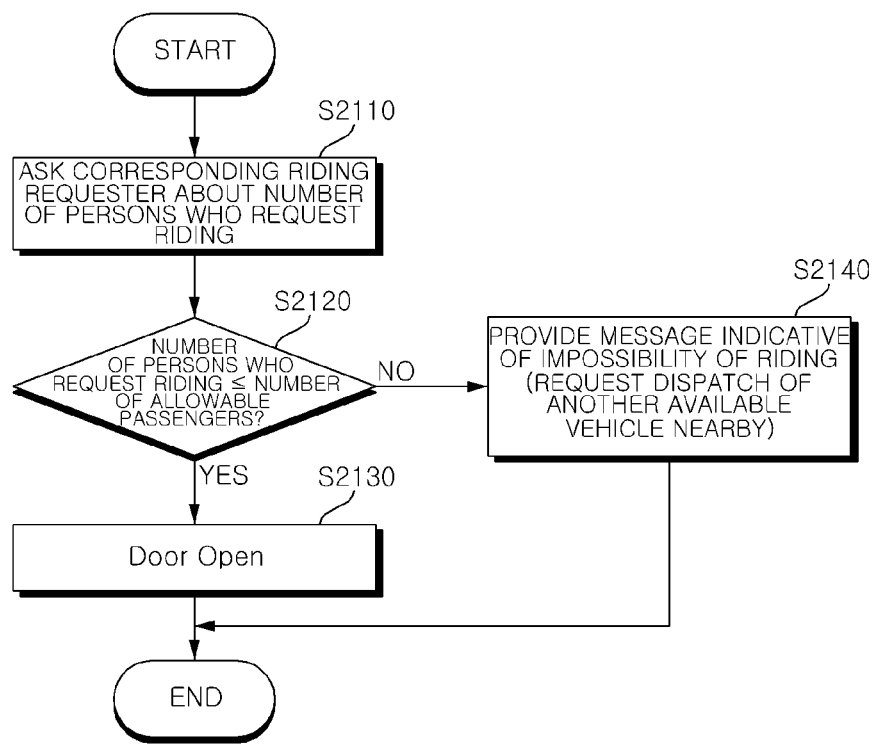

FIGS. 21*a* and 21*b* are views for explaining a group seeking a ride according to an embodiment of the present disclosure.

Referring to the drawings, the processor 970 may detect a first outside person 2110 from the external image data. The processor 970 may determine the riding intention of the first outside person 2110. The processor 970 may determine a second outside person 2120, located within a predetermined distance from the first outside person 2110, to be a member of the same group as the first outside person 2110. The processor 970 may determine a third outside person 2130, located within a predetermined distance from the first outside person 2110 or the second outside person 2120, to be a member of the same group as the first outside person 2110. The processor 970 may determine the first outside person 2110, the second outside person 2120, and the third outside person 2130 to be members of the group seeking a ride.

The processor 970 may verify the number of passengers (S2110). The processor 970 may verify the number of passengers before the members of the group seeking a ride get in the vehicle. If the number of persons who request riding is equal to or less than the number of allowable passengers (S2120), the processor 970 may open the door and may generate a signal for providing a riding guide message (S2130). If the number of persons who request riding is greater than the number of allowable passengers (S2120), the processor 970 may generate a signal for providing a message indicative of impossibility of riding. In this case, the processor 970 may request dispatch of another available vehicle nearby (S2140).

Figure 22:
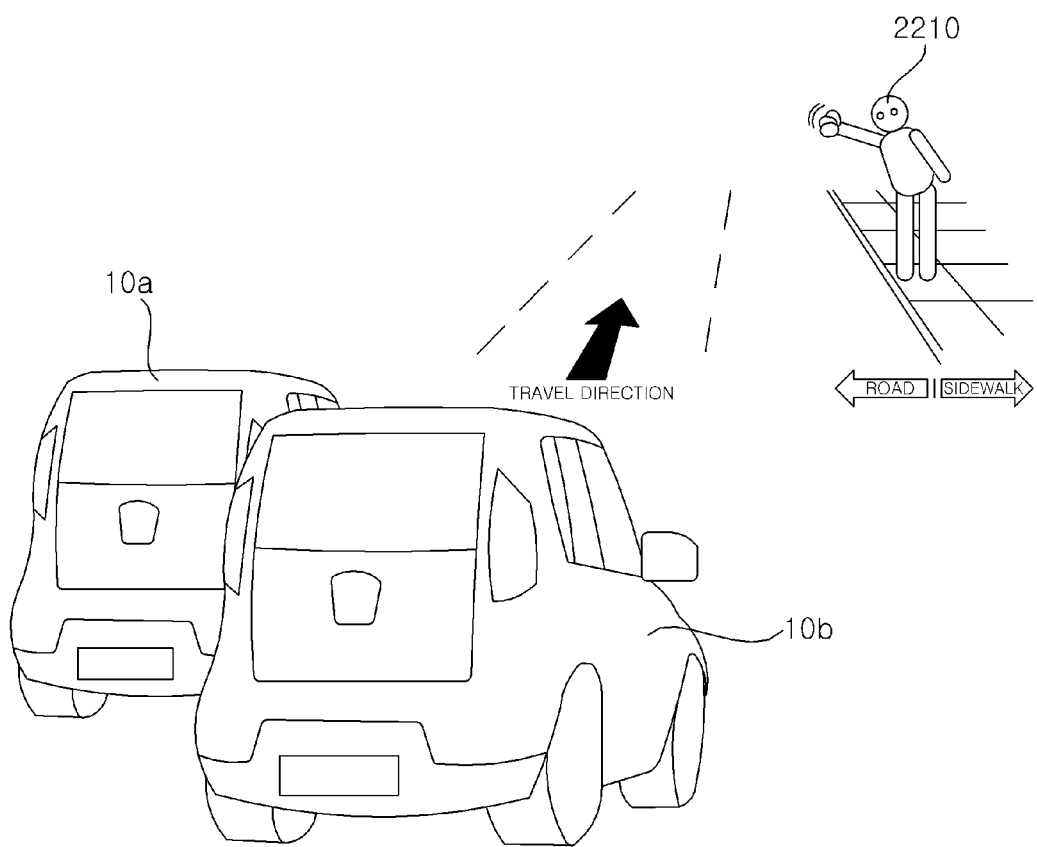
FIGS. 22 and 23 are views for explaining the operation of the electronic device for a vehicle that controls a plurality of vehicles according to an embodiment of the present disclosure.
Figure 23:
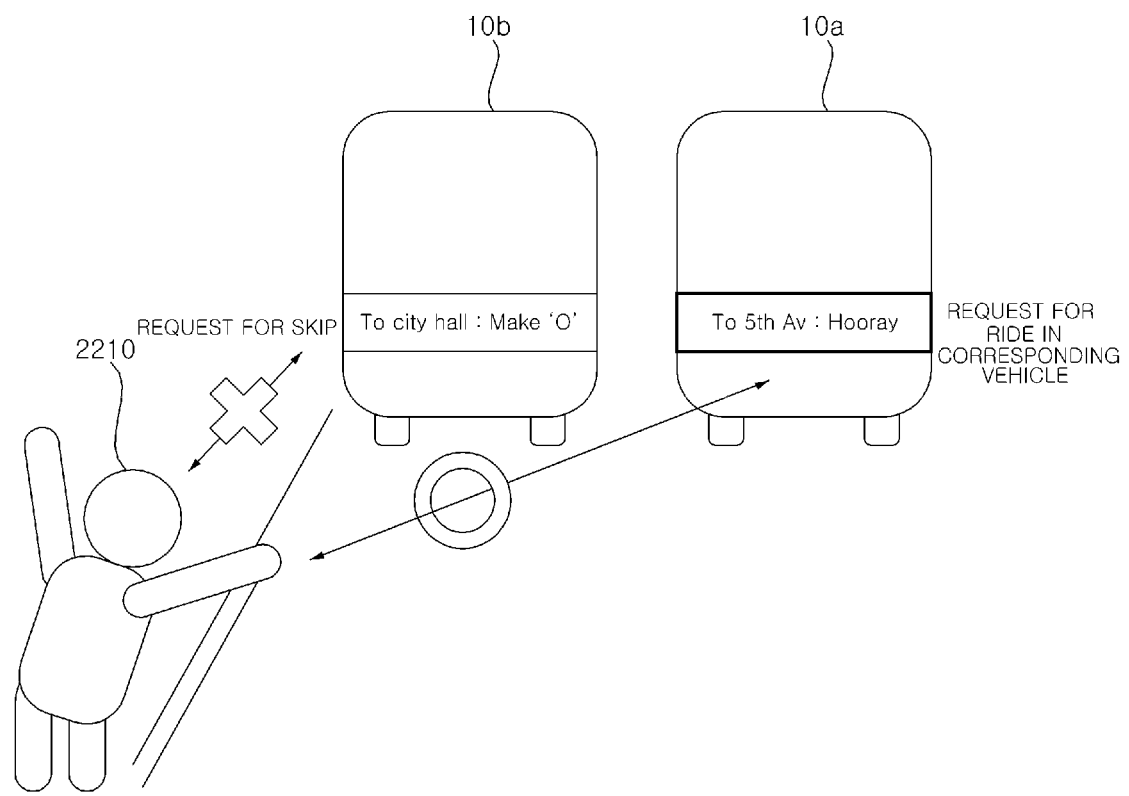

FIGS. 22 and 23 are views for explaining the operation of the electronic device for a vehicle that controls a plurality of vehicles according to an embodiment of the present disclosure.

The processor 970 may acquire external image data from a plurality of vehicles 10*a* and 10*b*. The processor 970 may recognize and determine a person (an outside person) who requests riding based on a plurality of pieces of image data.

Referring to FIG. 22, in the case in which the first vehicle 10a and the second vehicle 10b travel to the same destination, the processor 970 may allow the plurality of vehicles to share information about the outside person. The processor 970 may select one of the first vehicle 10a and the second vehicle 10b as an available vehicle according to a predetermined criterion.

Upon determining that one person requests riding, the processor 970 may select a vehicle that is in a state of being capable of easily changing lanes as an available vehicle. Specifically, the processor 970 may select the second vehicle 10b, which is traveling in the lane closer to the outside person 2210, as an available vehicle.

Upon determining that two or more persons request riding, the processor 970 may select a vehicle having a smaller number of occupants as an available vehicle. Referring to FIG. 23, in the case in which the first vehicle 10a and the second vehicle 10b travel to different destinations, the processor 970 may generate a signal so that the respective vehicles output mutually different interaction messages. For example, the processor 970 may generate a signal so that the first vehicle 10a outputs an interaction message requesting the performance of a first gesture. For example, the processor 970 may generate a signal so that the second vehicle 10b outputs an interaction message requesting the performance of a second gesture. Upon determining the gesture of the outside person 2210 to be the first gesture, the processor 970 may select the first vehicle 10a as an available vehicle.

FIGS. 24 to 27 are views for explaining the operation of calling a vehicle using a personal terminal according to an embodiment of the present disclosure.

Figure 24:
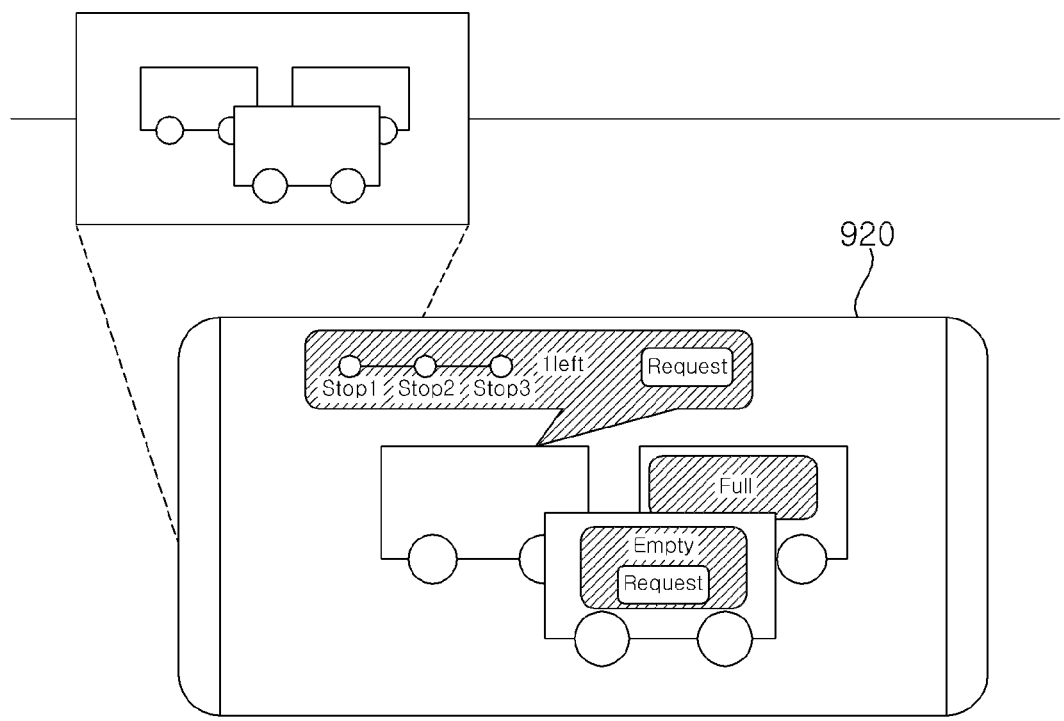
FIGS. 24 to 27 are views for explaining the operation of calling a vehicle using a personal terminal according to an embodiment of the present disclosure.

Referring to FIG. 24, the vehicular electronic device 900 may receive the riding request from a user terminal 920.

The user terminal 920 may provide an augmented reality (AR) user interface (UI). The user terminal 920 may display vehicle state information received from the vehicular electronic device 900 in the image. For example, the user terminal 920 may display destination information, route information, available seat information, occupant information, special-vehicle-related information, or the like. The user terminal 920 may display pieces of vehicle state information and vehicles in one-to-one correspondence. For example, the user terminal 920 may display vehicle state information on or near the corresponding vehicle.

The user may verify vehicle state information and may request a ride through the user terminal 920. The user terminal 920 may transmit a riding request signal based on user input to the vehicular electronic device 900.

Figure 25:
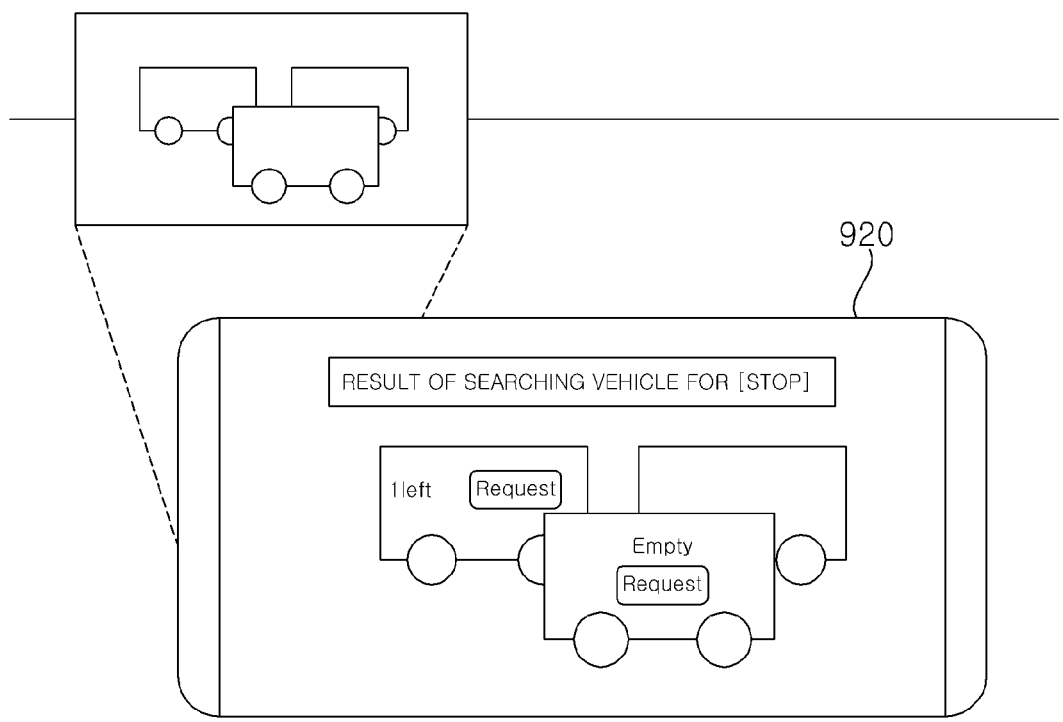

Referring to FIG. 25, the user terminal 920 may highlight a vehicle that meets a user's request among a plurality of vehicles in the image. For example, the user terminal 920 may highlight a vehicle that is heading for the destination input by the user and has an available seat.

The user may select the highlighted vehicle and may request a ride therein. The user terminal 920 may transmit a riding request signal based on user input to the vehicular electronic device 900.

Figure 26:
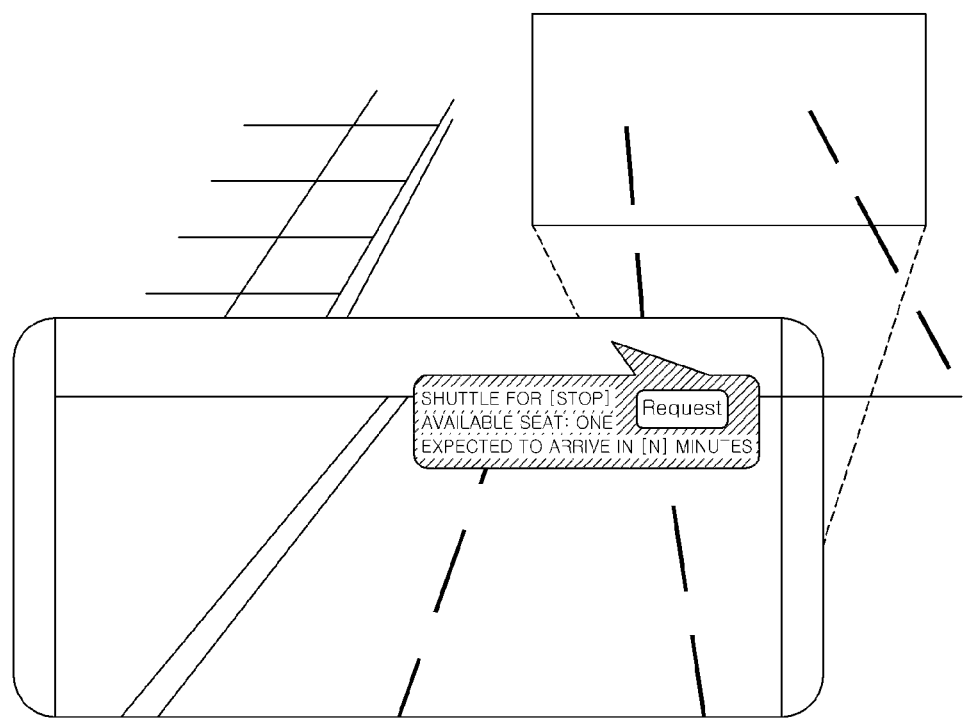

Referring to FIG. 26, even when a vehicle is not displayed in the image but is approaching, the user terminal 920 may display information about the state of the vehicle. In this case, the user terminal 920 may display the vehicle state information in the direction in which the vehicle is approaching in the image.

Figure 27:
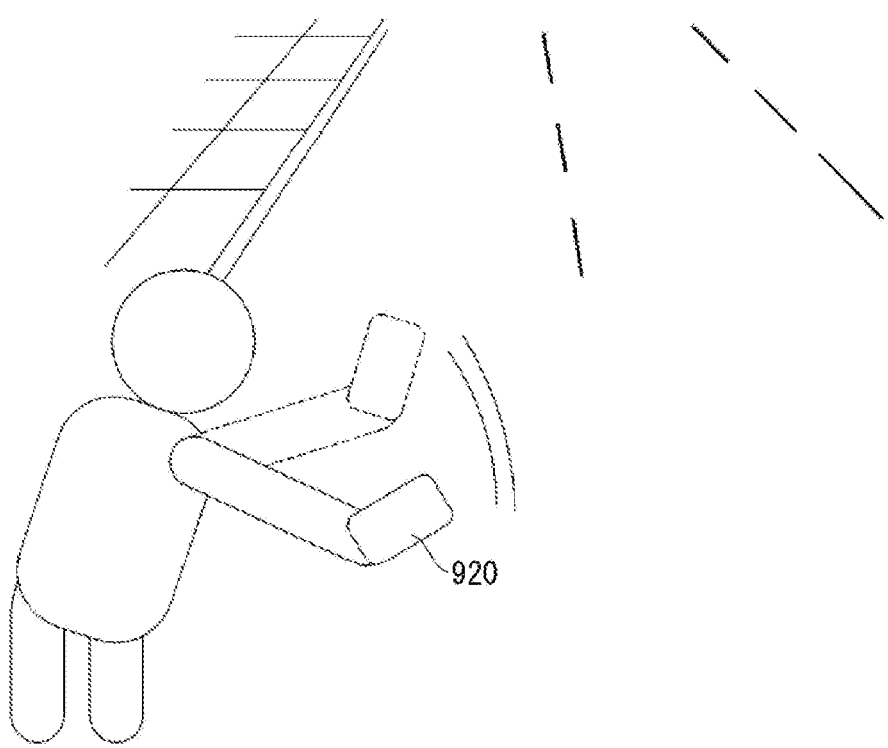

Referring to FIG. 27, when a vehicle is not visible, the user may input a destination through the user terminal 920, and then may make a gesture of waving the user terminal 920, thereby generating a signal requesting a ride in the vehicle. When a predetermined movement of the user terminal 920 is sensed after the input of the destination, the user terminal 920 may transmit a riding request signal to the vehicular electronic device 900.

The aforementioned present disclosure may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid-State Disk (SSD), a Silicon Disk Drive (SDD), Read-Only Memory (ROM), Random-Access Memory (RAM), CD-ROM, magnetic tapes, floppy disks, optical data storage devices, carrier waves (e.g. transmission via the Internet), etc. In addition, the computer may include a processor and a controller. The above embodiments are therefore to be construed in all aspects as illustrative and not restrictive. It is intended that the present disclosure cover the modifications and variations of this disclosure provided they come within the scope of the appended claims and their equivalents.

The invention claimed is:

1. A system, comprising:
a plurality of vehicles each of which is equipped with a plurality of external displays;
a traffic information server; and
a vehicular electronic device for generating a signal for controlling the plurality of vehicles based on data received from the traffic information server and the plurality of vehicles and providing the signal to at least one of the plurality of vehicles,
wherein the vehicular electronic device comprises a processor configured to:
acquire image data acquired by a camera mounted in a vehicle among the plurality of vehicles,
determine a riding intention of an outside person based on a location, posture, and gesture of the outside person detected from the image data,
generate a control signal to stop the vehicle based on the riding intention, and
provide the control signal to the vehicle, and
wherein the processor is further configured to:
share information about the outside person with first and second vehicles among the plurality of vehicles, when the first and second vehicles travel to a same destination, and
generate a first signal for controlling the first and second vehicles to output interaction messages, which request mutually different gestures to the outside person, through at least one of the plurality of external displays and provide the first signal to the first and second vehicles, when the first and second vehicles travel to different destinations.

2. The system of claim 1, wherein the processor is configured to select an information output display from among a plurality of external displays mounted in the vehicle according to a travel direction of the vehicle.

3. The system of claim 2, wherein the processor is configured to provide a signal so that information about a status of the vehicle is displayed on the information output display.

4. The system of claim 3, wherein the processor is configured to provide a signal so that at least one of destination information, route information, available seat information, occupant information, or special-vehicle-related information is displayed on the information output display.

5. The system of claim 3, wherein the processor is configured to:
determine whether there is available space for stopping in a road on which the vehicle is traveling, and
upon determining that there is no available space for stopping, provide a signal so that information about non-availability of the vehicle is displayed on the information output display.

6. The system of claim 2, wherein the processor is configured to provide a signal so that content for interaction with the outside person is displayed on the information output display.

7. The system of claim 1, wherein the processor is configured to determine the riding intention of the outside person based on a posture of a head, a posture of arms, and a posture of a body of the outside person.

8. The system of claim 7, wherein the processor is configured to determine, upon detecting that the outside person makes a gesture of waving in a state in which the outside person is located near a boundary between a road and a sidewalk, the gesture of waving to be a gesture indicating a riding request intention.

9. The system of claim 1, wherein the processor is configured to determine, upon detecting that the outside person makes a gesture of waving while holding a personal terminal, the gesture of waving to be a gesture indicating a riding request intention.

10. The system of claim 1, wherein the processor is configured to give, upon detecting a plurality of outside persons, priority to a first outside person who is closest to the vehicle.

11. The system of claim 10, wherein the processor is configured to generate a signal to output light toward the first outside person.

12. The system of claim 1, wherein the processor is configured to determine, upon detecting a group composed of a plurality of outside persons and upon determining that a distance between the plurality of outside persons is equal to or less than a reference value, the group to be a group seeking a ride.

13. A method of controlling a plurality of vehicles in a system comprising the plurality of vehicles each of which is equipped with a plurality of external displays and a vehicular electronic device, the method comprising:
acquiring, by at least one processor included in the vehicular electronic device, image data acquired by a camera mounted in a vehicle among the plurality of vehicles;
determining, by the at least one processor, a riding intention of an outside person based on a location, posture, and gesture of the outside person detected from the image data;
generating, by the at least one processor, a control signal to stop the vehicle based on the riding intention;
providing the control signal to the vehicle;
sharing, by the at least one processor, information about the outside person with first and second vehicles among the plurality of vehicles, when the first and second vehicles travel to a same destination; and
generating, by the at least one processor, a signal for controlling the first and second vehicles to output interaction messages, which request mutually different gestures to the outside person, through at least one of the plurality of external displays and providing the first signal to the first and second vehicles, when the first and second vehicles travel to different destinations.

14. The method of claim 13, further comprising:
selecting, by the at least one processor, an information output display from among a plurality of external displays mounted in the vehicle according to a travel direction of the vehicle.

15. The method of claim 14, further comprising:
providing, by the at least one processor, a signal so that information about a status of the vehicle is displayed on the information output display.

16. The method of claim 15, wherein the providing a signal so that information is displayed comprises providing, by the at least one processor, a signal so that at least one of destination information, route information, available seat information, occupant information, or special-vehicle-related information is displayed on the information output display.

17. The method of claim 15, wherein the providing a signal so that information is displayed comprises:
determining, by the at least one processor, whether there is available space for stopping in a road on which the vehicle is traveling; and
upon determining that there is no available space for stopping, providing, by the at least one processor, a signal so that information about non-availability of the vehicle is displayed on the information output display.

18. The method of claim 13, wherein the determining a riding intention comprises determining, by the at least one processor, a riding intention of the outside person based on a posture of a head, a posture of arms, and a posture of a body of the outside person.

19. The method of claim 13, wherein the determining a riding intention comprises, upon detecting that the outside person makes a gesture of waving while holding a personal terminal, determining, by the at least one processor, the gesture of waving to be a gesture indicating a riding request intention.

20. The method of claim 19, wherein the determining a riding intention comprises, upon detecting that the outside person makes a gesture of waving in a state in which the outside person is located near a boundary between a road and a sidewalk, determining, by the at least one processor, the gesture of waving to be a gesture indicating a riding request intention.

* * * * *